US008169320B2

(12) United States Patent
Malocha et al.

(10) Patent No.: US 8,169,320 B2
(45) Date of Patent: *May 1, 2012

(54) ORTHOGONAL FREQUENCY CODING FOR SURFACE ACOUSTIC WAVE DEVICES

(75) Inventors: Donald Malocha, Winter Springs, FL (US); Nikolai Kozlovski, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,906

(22) Filed: Feb. 18, 2011

(65) Prior Publication Data

US 2011/0135026 A1      Jun. 9, 2011

Related U.S. Application Data

(60) Division of application No. 12/618,034, filed on Nov. 13, 2009, now Pat. No. 7,952,482, which is a continuation-in-part of application No. 11/508,674, filed on Aug. 23, 2006, now Pat. No. 7,777,625.

(60) Provisional application No. 60/711,278, filed on Aug. 25, 2005.

(51) Int. Cl.
*G08B 13/14*      (2006.01)
(52) U.S. Cl. .................. 340/572.1; 340/10.1; 340/5.8
(58) Field of Classification Search .............. 340/572.1, 340/572.5, 572.7, 10.1, 573.4, 5.25, 5.7, 340/5.8
See application file for complete search history.

(56) References Cited

U.S. PATENT DOCUMENTS

| 4,166,258 A | 8/1979 | Tseng |
| 4,370,633 A | 1/1983 | Schofield |
| 4,527,275 A | 7/1985 | Russell |
| 4,642,506 A | 2/1987 | Lewis |
| 4,746,830 A | 5/1988 | Holland |
| 5,187,718 A * | 2/1993 | Takehara ............... 375/343 |
| 5,217,018 A | 6/1993 | Dias |
| 5,434,893 A * | 7/1995 | Le Roy et al. ............ 375/142 |
| 5,602,800 A | 2/1997 | Duggal |
| 5,670,920 A | 9/1997 | Morgan |
| 5,761,196 A | 6/1998 | Ayerst |

(Continued)

OTHER PUBLICATIONS

Wright, Modeling and Experimental Measurements of the Reflection Properties of Saw Metallic Gratings, Proc. IEEE International Ultrasonics Symposium, 1984, pp. 54-63.

(Continued)

*Primary Examiner* — Daniel Previl
(74) *Attorney, Agent, or Firm* — Brian S. Steinberger; Law Offices of Brian S. Steinberger, P.A.

(57) ABSTRACT

Methods and systems for coding SAW OFC devices to mitigate code collisions in a wireless multi-tag system. Each device producing plural stepped frequencies as an OFC signal with a chip offset delay to increase code diversity. A method for assigning a different OFC to each device includes using a matrix based on the number of OFCs needed and the number chips per code, populating each matrix cell with OFC chip, and assigning the codes from the matrix to the devices. The asynchronous passive multi-tag system includes plural surface acoustic wave devices each producing a different OFC signal having the same number of chips and including a chip offset time delay, an algorithm for assigning OFCs to each device, and a transceiver to transmit an interrogation signal and receive OFC signals in response with minimal code collisions during transmission.

17 Claims, 19 Drawing Sheets

U.S. PATENT DOCUMENTS

| | | | |
|---|---|---|---|
| 5,895,996 | A | 4/1999 | Takagi |
| 5,909,461 | A | 6/1999 | Koga |
| 6,201,800 | B1 | 3/2001 | Tsubouchi |
| 6,265,807 | B1 | 7/2001 | Koga |
| 6,424,916 | B2 | 7/2002 | Nysen |
| 6,525,624 | B1 | 2/2003 | Hikita |
| 6,966,493 | B2 | 11/2005 | Hartmann |
| 6,992,547 | B2 | 1/2006 | Bergmann |
| 7,005,964 | B2 * | 2/2006 | Edmonson et al. .......... 340/10.1 |
| 7,623,037 | B1 * | 11/2009 | Malocha ................... 340/572.1 |
| 7,777,625 | B1 * | 8/2010 | Puccio et al. .............. 340/572.1 |
| 7,952,482 | B2 * | 5/2011 | Malocha et al. .......... 340/572.1 |
| 2002/0105392 | A1 | 8/2002 | Fujii |
| 2003/0231107 | A1 | 12/2003 | Edmonson |
| 2005/0001699 | A1 | 1/2005 | Takamine |
| 2006/0049714 | A1 | 3/2006 | Liu |

OTHER PUBLICATIONS

Malocha, et al., SAW Sensors Using Orthogonal Frequency Coding, IEEE International . . . , 2004, retrieved on Aug. 17, 2006, retrieved from: http://caat.engr.ucf.edu/publications/SAW%Sensors20Using%20Orthogonal%20Frequency%20Coding.pdf.

Malocha, et al., Orthogonal Frequency Coding for SAW Device Applications, Ultrasonics Symposium, 2004, pp. 23-27, vol. 2.

Puccio, et al., Orthogonal Frequency Coding for SAW Tagging and Sensors, PubMed, 2006, pp. 377-384, vol. 53, No. 2, abstract.

Puccio, et al., Implementations of Orthogonal Frequency Coded SAW Devices Using Apodized Reflectors, Proceedings of the 2005 IEEE International, 2005, pp. 892-896.

Carter, et al., Saw Device Implementation of a Weighted Stepped Chirp Code Signal for Direct Sequence Spread Spectrum Communication Systems, IEEE, 2000.

Omori, et al., Optimisation of Weighted SAW Grating Reflectors with Minimized Time Delay Deviation, Proc. IEEE International Frequency Control Symposium and PDA Exhibition, 2001, pp. 666-670.

Tanski, Saw Resonators Utilizing Withdrawal Weighted Reflectors, IEEE Transactions on Sonics and Ultrasonics, 1979, pp. 404-410, vol. 26, No. 6.

White, et al., Synthesis and Design of Weighted Reflector Banks for Saw Resonators, Proc. IEEE International Ultrasonics Symposium, 1978, pp. 634-638.

Woo, Orthogonal Code Design for Quasi-Synchronous CDMA, Electronic Letters, 2000, pp. 1632-1633, vol. 36, No. 19, abstract.

Dudzik, et al., Orthogonal Code Design for Passive Wireless Sensors, Communications, 2008, 28th Niennial Symposium, 2008, pp. 316-319, abstract.

* cited by examiner

ORTHOGONAL FREQUENCY CODING FOR SURFACE ACOUSTIC WAVE DEVICES

This application is a divisional application of U.S. patent application Ser. No. 12/618,034 filed on Nov. 13, 2009 now U.S. Pat. No. 7,952,482, now allowed, which is a continuation-in-part of U.S. patent application Ser. No. 11/508,674 filed on Aug. 23, 2006, now U.S. Pat. No. 7,777,625 issued on Nov. 24, 2009, which claimed the benefit of priority to U.S. Provisional Patent Application No. 60/711,278 filed on Aug. 25, 2005 and U.S. patent application Ser. No. 11/521,708 filed on Sep. 15, 2006 which claimed the benefit of priority to U.S. Provisional Patent Application No. 60/718,575 filed on Sep. 19, 2005.

FIELD OF THE INVENTION

This invention relates to orthogonal frequency coding and surface acoustic wave devices and, in particular, to methods and systems for surface acoustic wave coding for orthogonal frequency coded devices to reduce code collisions in a multi-tag system.

BACKGROUND AND PRIOR ART

The surface acoustic wave (SAW) sensor offers advantages in that it is wireless, passive, small and has varying embodiments for different sensor applications. Surface acoustic wave (SAW) sensors are capable of measuring physical, chemical and biological variables and have the ability to operate in harsh environments. In addition, there are a variety of ways of encoding the sensed data information for retrieval. Single sensor systems can typically use a single carrier RF frequency and a simple device embodiment, since tagging is not required. In a multi-sensor environment, it is necessary to both identify the sensor as well as obtain the sensed information. The SAW sensor then becomes both a sensor and a tag and must transmit identification and sensor information simultaneously.

Known SAW devices include delay line and resonator-based oscillators, differential delay lines, and devices utilizing multiple reflective structures. Single sensor systems can typically use a single carrier frequency and a simple coding technique, since tagging is not required. However, there are advantages of using spread spectrum techniques for device interrogation and coding, such as enhanced processing gain and greater interrogation power.

The use of orthogonal frequencies for a wealth of communication and signal processing applications is well known to those skilled in the art. Orthogonal frequencies are often used in an M-ary frequency shift keying (FSK) system. There is a required relationship between the local, or basis set, frequencies and their bandwidths which meets the orthogonality condition. If adjacent time chips have contiguous local stepped frequencies, then a stepped chirp response is obtained. See S. E. Carter and D. C. Malocha, "SAW device implementation of a weighted stepped chirp code signal for direct sequence spread spectrum communication systems", IEEE Transactions on Ultrasonics, Ferroelectrics, and Frequency control, Vol. 47, July 2000, pp. 967-973.

Co-pending U.S. patent application Ser. No. 11/508,674 filed on Aug. 23, 2006, assigned to the same assignee as the present application, teaches weighted surface acoustic wave reflector gratings for coding identification tags and sensors to enable unique sensor operation and identification for a multi-sensor environment. In an embodiment, the Weighted reflectors are variable while in another embodiment the reflector gratings are apodized. The weighting technique allows the designer to decrease reflectively and allows for more chips to be implemented in a device and, consequently, more coding diversity. As a result, more tags and sensors can be implemented using a given bandwidth when compared with uniform reflectors. Use of weighted reflector gratings with OFC makes various phase shifting schemes possible, such as in-phase and quadrature implementations of coded waveforms resulting in reduced device size and increased coding. The device may include a single transducer/antenna pair with a bank of reflectors on one side of the transducer/antenna pair, or a bank of reflectors on both sides of the transducer/antenna pair, or alternatively, a unidirectional transducer may be used to reduce the device loss and size.

U.S. patent application Ser. No. 11/521,708 filed on Sep. 15, 2006, now U.S. Pat. No. 7,623,037 issued on Nov. 24, 2009, assigned to the same assignee as the present application, and which is incorporated herein by reference describes and claims a surface acoustic wave device including a substrate, at least two banks of reflectors fabricated on said substrate for producing at least two contiguous stepped frequencies as an orthogonal coded signal, wherein each of said at least two contiguous stepped frequencies have a different center frequency within a bandwidth and at least two transducer and antenna pairs each having a different tuned center frequency on said substrate, each of said at least two transducer/antenna pairs coupled with one of said at least two banks of reflectors for receiving an orthogonal frequency coded signal generated by a corresponding one of said at least two banks of reflectors, wherein the bandwidth of each transducer/antenna pair is inversely proportional to the number of transducer/antennas pairs used.

Co-pending U.S. patent application Ser. No. 11/703,377 filed on Feb. 7, 2007, assigned to the same assignee as the present application, which is incorporated herein by reference, teaches an orthogonal frequency coded device that includes a substrate, a transducer and plural acoustic tracks each having a bank of reflectors fabricated on the substrate. The plural acoustic tracks are coupled with the transducer and each acoustic track produces a different code sequence with a different delay between a starting chip sequence in each of the different code sequences. The sum of the different code sequences forms an orthogonal coded signal for the device to provide increased coding by including delays in the code sequences.

Each of the banks of reflectors includes a first and second bank of reflectors located on opposite sides of said transducer and coupled with the transducer. Each bank of reflectors includes plural reflectors coupled together each producing an orthogonal frequency within a bandwidth to generate the code sequence for a corresponding one of the plural tracks. A summation of the codes sequences from the plural tracks produces the orthogonal coded signal for the device.

Surface acoustic wave tags, by their passive nature, are purely a reflective device; changing amplitude, phase and/or delay of the interrogation signal over the band of interest. Because of these properties, the SAW tag is equivalent to a radar target, with the exception that the return, or reflected signal, has been modified in amplitude, phase, or delay in a predefined manner. This change in device parameters is similar to the change of a radar target due to movement causing a Doppler shift. Because there is no handshake in the wireless passive system, where device return signal parameters can be actively modified, the return signals may return in overlapping time positions with the desired signal energy, distorting the desired signal and possibly causing false identification or parameter extraction. Since the OFC SAW devices are tagged using spread spectrum techniques for identification, the device identification at the receiver is accomplished using matched filter and correlation techniques, as well as possibly digital signal processing. The device identification is made via its code, and the overlap of other SAW tags/sensors in the range of the transmitter causes code collisions. Code collisions are a difficult problem to mitigate given the asynchronous nature of the passive SAW tag. The co-inventors have researched numerous books and publications, with nothing of real value to aid in addressing the code collision problem for asynchronous, passive, multi tag environments.

There are numerous publications and books on code auto and cross correlation properties. In an active communication system where there is a handshake between transmitter and receiver, the use of signal level adjustment, orthogonal code sets, spatial diversity, and synchronization can optimize a communication link. This active link scenario provides many options to minimize code collision effects. For the SAW passive tag/sensor, the use of orthogonal code sets has little to no value without the availability of transceiver synchronization and signal level adjustment. Moreover, most work to date has been addressing CDMA codes and little effort on orthogonal frequency coding approaches.

For example, T-K Woo, Orthogonal code design for Quasi-synchronous CDMA", Electronic Letters, September 2000, Vol. 36, #9, 1632 examined orthogonal code design for quasi synchronous CDMA. The last sentence in the conclusion is, "However, the results for cross correlation are mixed". The Woo scheme has a lower variance but a higher mean". In general, most analysis was done on a statistical basis for CDMA active systems where it can be assumed that the signals are non stationary. In the case of a fixed SAW device and a fixed interrogator, the signals are stationary and re interrogating will just continuously give the wrong answer. Moreover, as code delays change with temperature or other measurand, the code collision can change from acceptable to unacceptable.

As another example, Dudzik, et. al., Orthogonal code design for passive wireless sensors, Communications, 2008 28th Biennial Symposium on 24-26 Jun. 2008, pp 316-319, describes orthogonal CDMA code design for passive wireless sensors. Dudzik sets two criteria:
1. Largest peak to sidelobe ratio of the auto correlation response of a given code
2. Smallest maximum peak value of cross correlation of that code with any other code in the set.

Dudzik, et. al. shows only summary results and a SAW sensor application, but no useful details are given. But also important is the fact that the criteria may not be correct in a passive, multi sensor environment. It appears that criteria (2) may be overly simplistic, since it is our belief that it is necessary to have the smallest maximum peak value of cross correlation of that code to the sum of all other codes in the set under the interrogation range. This is a much more stringent and difficult criteria.

Both examples are for CDMA coding and are not directly applicable to orthogonal frequency coding, but it does illustrate the lack of available work on passive systems. The addition of the OFC PN coding helps the code collision problem, but does not eliminate basic energy considerations and physical limitations.

SUMMARY OF THE INVENTION

A primary objective of the invention is to provide methods, system, apparatus and devices for producing wireless, passive SAW sensors have a very small size and a cost of only a few cents each in quantities of millions.

A secondary objective of the invention is to provide methods, systems, apparatus and devices with multiple transducers and antennas for use with orthogonal frequency coded SAW tags for temperature, pressure, gas and liquid sensors.

A third objective of the invention is to provide methods, systems, apparatus and devices for increasing the wireless sensor and tag range by reducing the device loss.

A fourth objective of the invention is to provide methods, systems, apparatus and devices for SAW sensors and tags using multiple transducer/antenna pairs each having a different center frequency to increase bandwidth, further reduce device loss and improve overall performance.

A fifth objective of the invention is to provide methods, systems, apparatus and devices that increases the bandwidth of a orthogonal frequency coded SAW sensors and tags.

A first embodiment provides a method to mitigate code collisions in a wireless multi-tag system, each one of the OFC surface acoustic wave devices generating an orthogonal frequency coded signal for identification. The method includes the steps of determining a M by N code matrix dimension based on the number of orthogonal frequency codes needed M and the number of locations chips can populate N, each row corresponding to one surface acoustic wave device orthogonal frequency code and each cell in each row corresponding to one orthogonal chip and the chips are orthogonal to each other at their respective center frequencies, populating each cell of the matrix with one of the orthogonal frequency chips with a different one of the orthogonal frequencies in each cell in each column, and applying one of the resulting codes from the populated matrix to each one of the surface acoustic wave OFC devices in the multi-tag system. The M by N matrix generating step includes determining the quantity of OFC surface acoustic devices M in the multi-tag system and determining the quantity of chips N in the orthogonal frequency coded signals for the OFC surface acoustic wave devices in the multi-tag system, wherein M is the number of codes with one single code per SAW tag. the number of overlapping chips m includes same-frequency overlaps.

The overlap of the chips can be m=n, then N=M and the number of overlapping chips m excludes same-frequency overlaps. The matrix step includes retrieving each next available orthogonal frequency code and assigning each chip in the orthogonal frequency code a location in the matrix and can include setting an orthogonal frequency coding multi-tag system bandwidth having a system center frequency. The retrieving step includes retrieving the first orthogonal frequency code, retrieving the next orthogonal frequency code when each chip in the first orthogonal frequency code has been assigned a location in the matrix, determining when the last chip in the last code has been assigned a location, returning the completed matrix when the last chip in the last code has been assigned a location, and returning one of an error message and an invalid code set when a location for one of the chips in the current code is not found.

The assigning step includes retrieving the each next chip in the first orthogonal frequency code, assigning each next chip one of the cells in one row of the matrix, retrieving the next orthogonal frequency code, retrieving the next chip in the next orthogonal frequency code, locating the cells in a next row of the matrix that is not assigned one of the chip, locating the columns of the located cells that are not assigned the same chip, locating the column with the least number of chips, assigning the chip to the cell in the column with the least number of chips when a column is located, locating the column with the second least number of chips when the column with a least number of chips is not located, assigning the chip to the cell in the column with the second least number of chips when the next column is located, returning the one of the error message or the invalid code set when no next column is located, determining if the chip is the last chip, repeating steps d through l when the chip is not the last chip, determining if the next orthogonal frequency code is the last orthogonal frequency code, repeating steps c through n when the next orthogonal frequency code is not the last orthogonal frequency code, and returning the completed matrix when the last chip in the last code has been assigned a location.

A second embodiment provides an asynchronous passive multi-tag system for detecting each one of plural surface acoustic wave orthogonal frequency coded devices in a multi-tag system. The system includes an orthogonal frequency coding system bandwidth having a system center frequency, plural surface acoustic wave devices each producing a different orthogonal frequency coded signal having the same number of chips in the code, each of the different OFC signals including a chip offset time delay, an algorithm for assigning an orthogonal frequency coded identification to each of the plural devices, and a transceiver in communication with the plural surface acoustic wave device for transmitting an orthogonal interrogation signal to the plural surface acoustic wave devices and receiving the different orthogonal coded signals from said plural surface acoustic wave devices. The chip offset delay can be a one chip offset delay between all of the plural orthogonal frequency codes in the system or a two chip offset delay between all of the plural orthogonal frequency codes in the system. The algorithm includes a first set of instructions to determine a M by N code matrix dimension based on the number of orthogonal frequency codes needed M and the number of locations chips can populate N, each row corresponding to one surface acoustic wave device orthogonal frequency code and each cell in each row corresponding to one orthogonal chip and the chips are orthogonal to each other at their respective center frequencies and a second set of instructions to populate each cell of the matrix with one of the orthogonal frequency chips with a different one of the orthogonal frequencies in each cell in each column.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
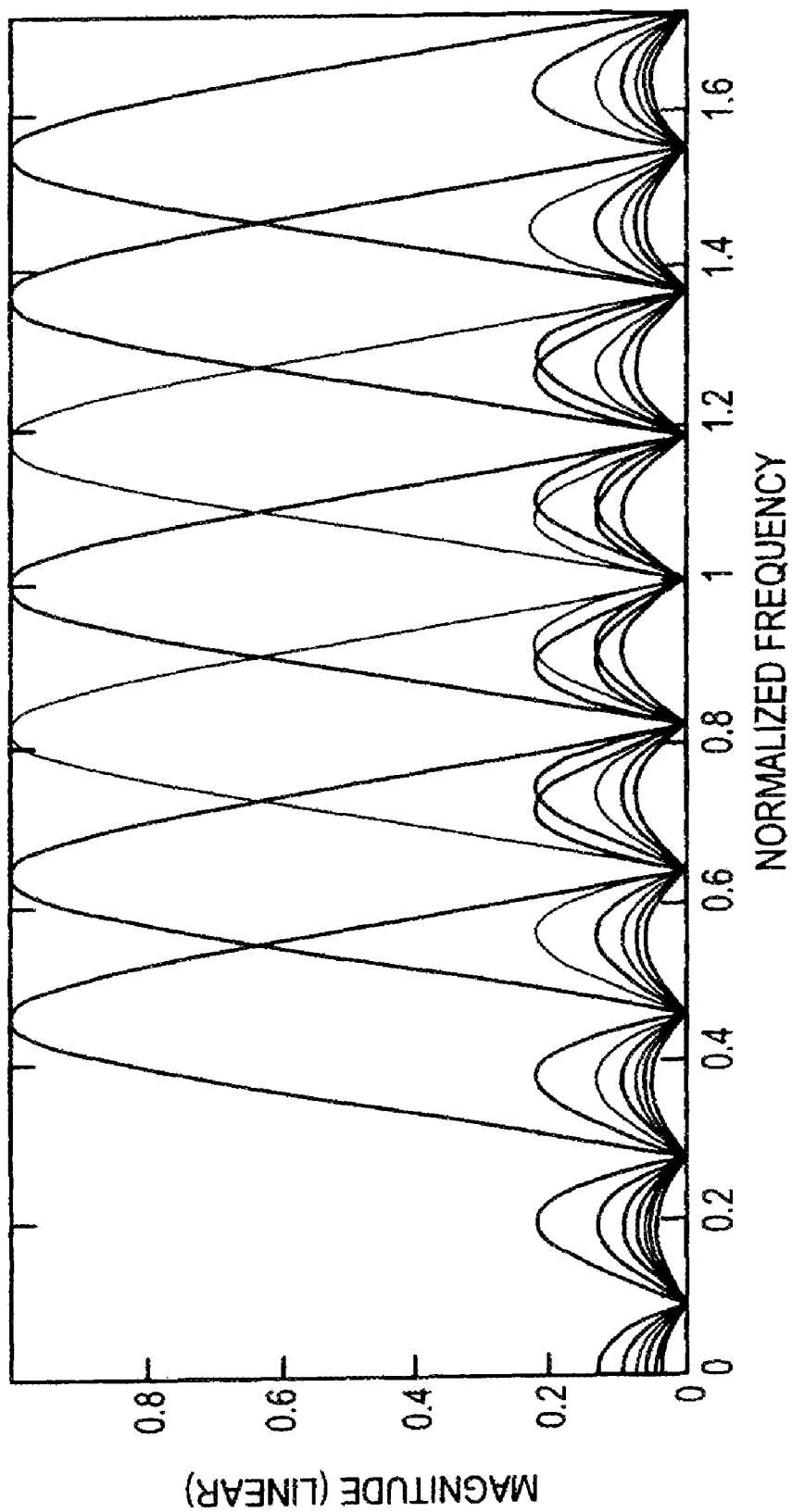
FIG. 1 is an example of a stepped chirp response.

It would be useful to review orthogonal frequency before discussing the method, system apparatus and device for using orthogonal frequency coding of the present invention. Orthogonal frequencies are used to spread the signal bandwidth. The orthogonality condition describes a relationship between the local chip frequencies and their bandwidths. As an example, consider the stepped linear chirp shown in FIG. 1. Seven coherent carriers are used to generate the signal shown. Each chip contains an integer number of carrier half cycles due to the orthogonality condition. Under these conditions, the resulting waveform is continuous. The conditions, however, do not require that the local frequency of adjacent chips, that are contiguous in time, be contiguous in frequency. Instead, the time function of a bit provides a level of frequency coding by allowing a shuffling of the chip frequencies in time.

Figure 2:
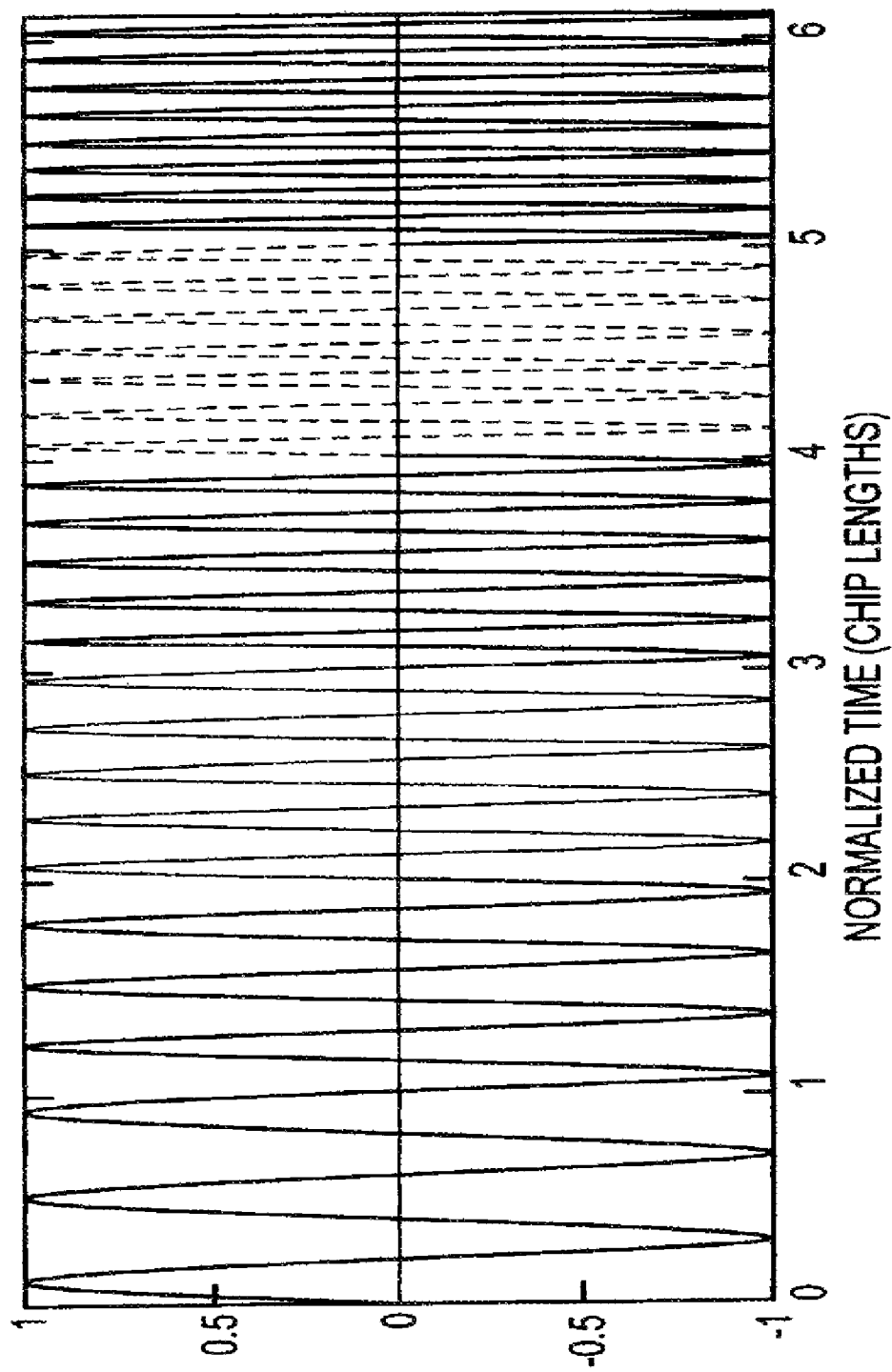
FIG. 2 is an example of an OFC chip frequency response.
Figure 3:
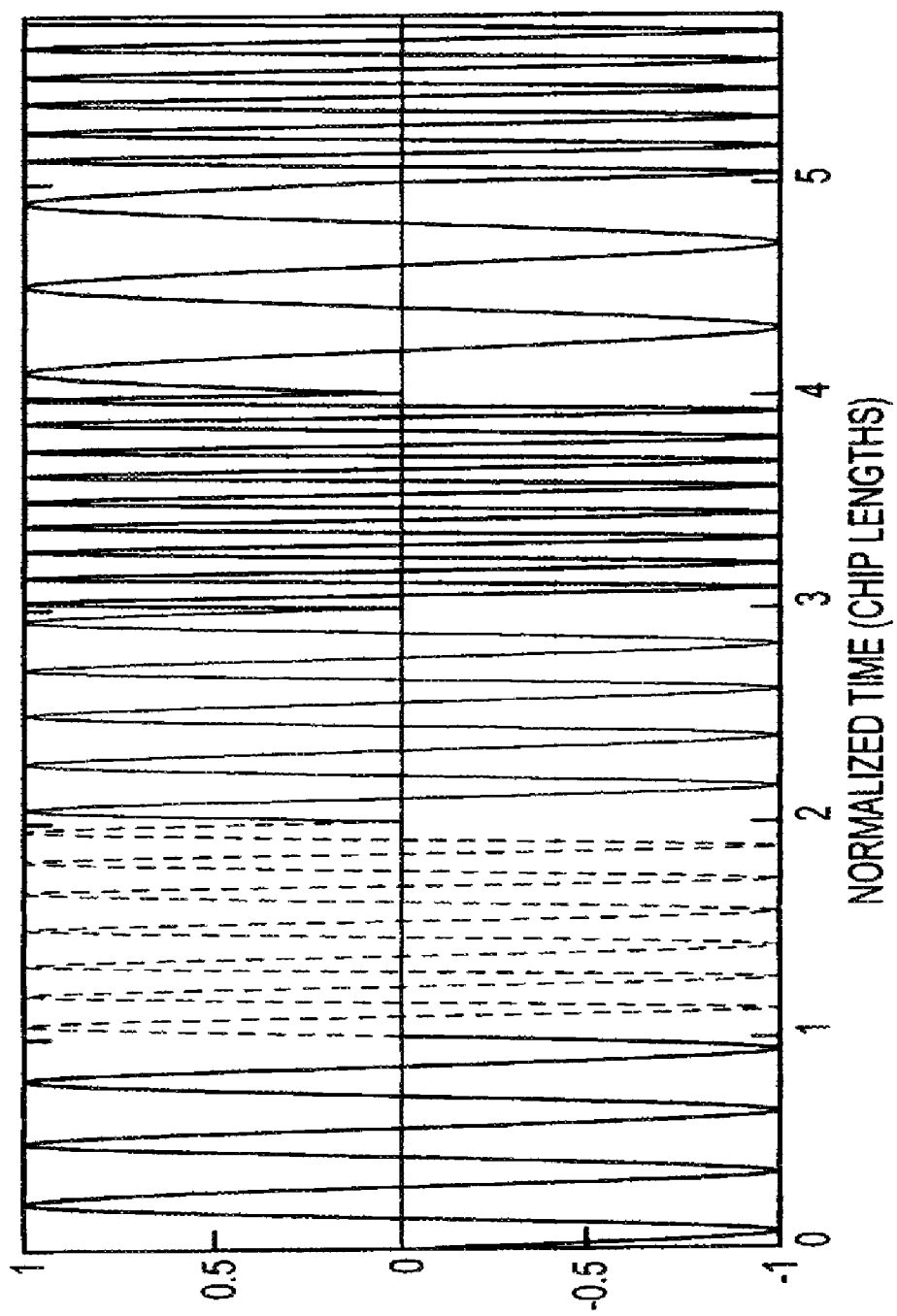
FIG. 3 is an example of a 7 chip OFC waveform based on the placement of chips.

The chip frequency response is shown in FIG. 2. These responses are a series of sampling functions with null bandwidths equal to $2 \cdot \tau^{-1}$. In addition, the sampling function center frequencies are separated by multiples of $\tau^{-1}$. Coding is accomplished by shuffling the chips to produce signal such as shown in FIG. 3, wherein the adjacent frequencies are not required to be sequential. The code is now determined by the order in which the orthogonal frequencies are used. Both signals occupy the same bandwidth and the coded information is contained within the signal phase. A more complete description of orthogonal frequency coding is given in D. C. Malocha, et al., "Orthogonal frequency coding for SAW device application," 2004 IEEE International Ultrasonics, Ferroelectrics, and Frequency Control 50$^{th}$ Anniversary Joint Conference, in press, which is incorporated herein by reference.

In the example shown in FIG. 3, the seven local chip frequencies are contiguous in frequency but are not ordered sequentially in time and the chip weights are all unity. If the local chip frequencies were ordered high to low or low to high, the time sequence would be a stepped down-chirp and up-chirp, respectively. The start of the chip carrier frequency begins at zero amplitude, as seen in FIGS. 2 and 3, which is a condition of the orthogonality.

The OFC technique provides a wide bandwidth spread spectrum signal with all the inherent advantages obtained from the time-bandwidth product increase over the data bandwidth. The OFC concept allows for a wide bandwidth, chirp interrogation, frequency and binary coding per bit, a reduced compressed pulse width as compared to a PN sequence, and a secure code. The OFC technique of the present invention can be applied to ultra-wide-band applications since the fractional bandwidth can exceed 20% and can be used in a multi-tag or sensor environment by using proper coding techniques.

Figure 4:
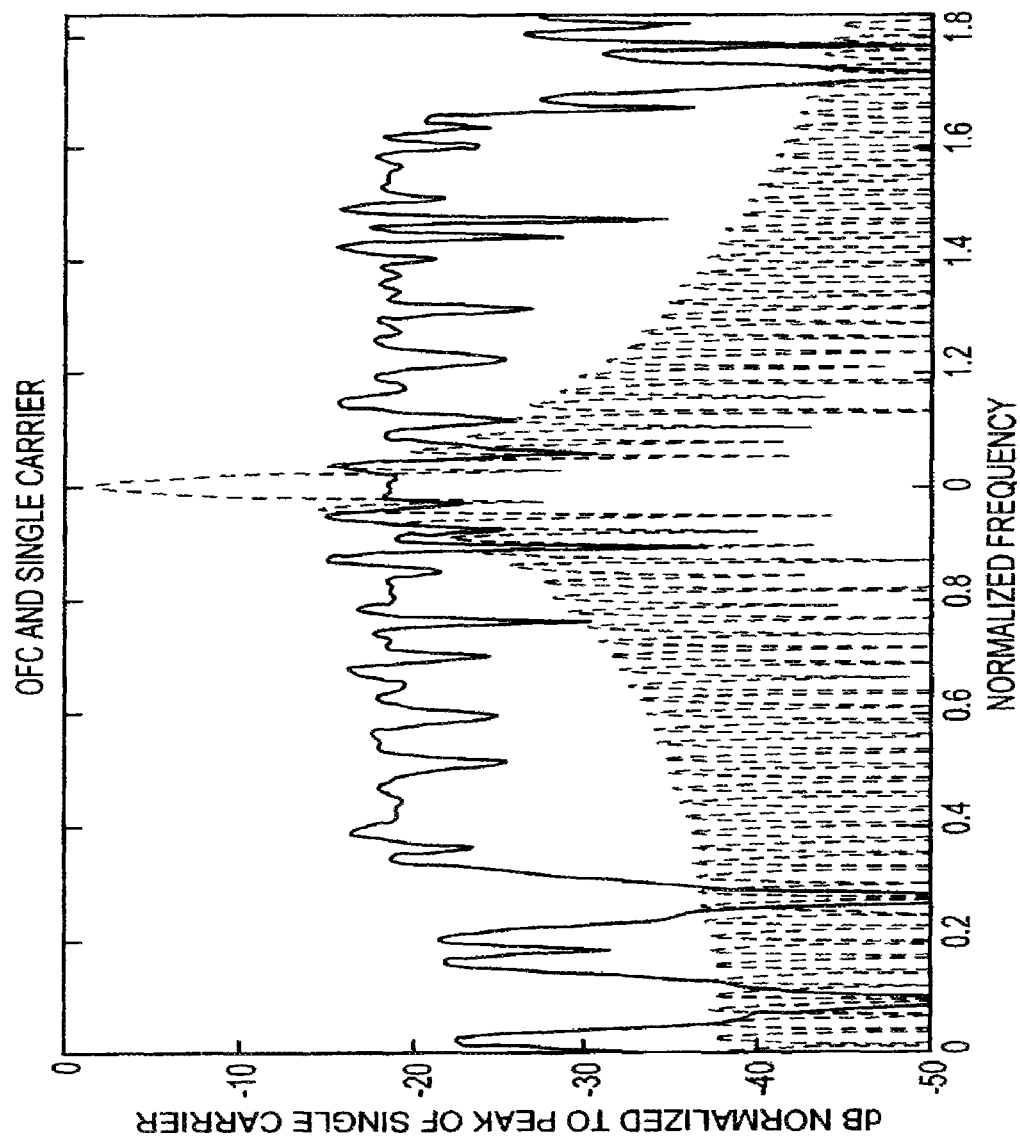
FIG. 4 shows the time autocorrelation of a single carrier PN code and a PN-OFC signal having a 7 chip Barker code modulating the chips of both signals.
Figure 6:
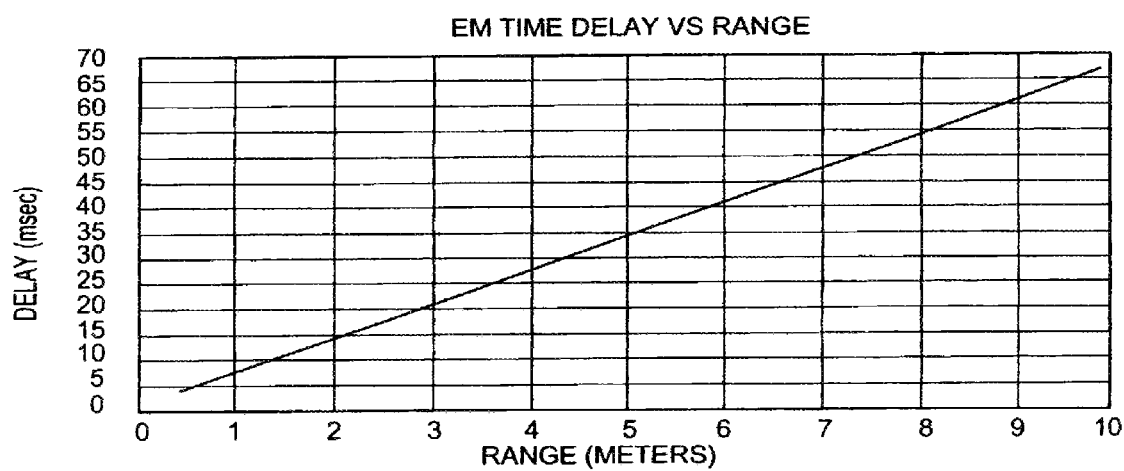
FIG. 6 is a graph showing the electromagnetic time delay verses range.

In addition to the OFC coding, each chip can be weighted as ±1, giving a pseudo noise (PN) code in addition to the OFC, namely PN-OFC. This does not provide any additional processing gain since there is no increase in the time bandwidth product, but does provide additional code diversity for tagging. FIG. 6 shows the autocorrelation of a 7 bit Barker code applied to an OFC shown with a solid line and a single carrier frequency shown with a dashed line. The pseudo noise code has a compressed pulse width of $2 \cdot \tau_C$, or a $PG_{PN}$=7 as compared $PG_{PN-OFC}$=49. The compressed pulse width of the OFC is a function of the bandwidth spread and not the pseudo noise code; yielding comparable pulse-width and side lobes results, as shown in FIG. 4 with pseudo noise code.

Figure 5:
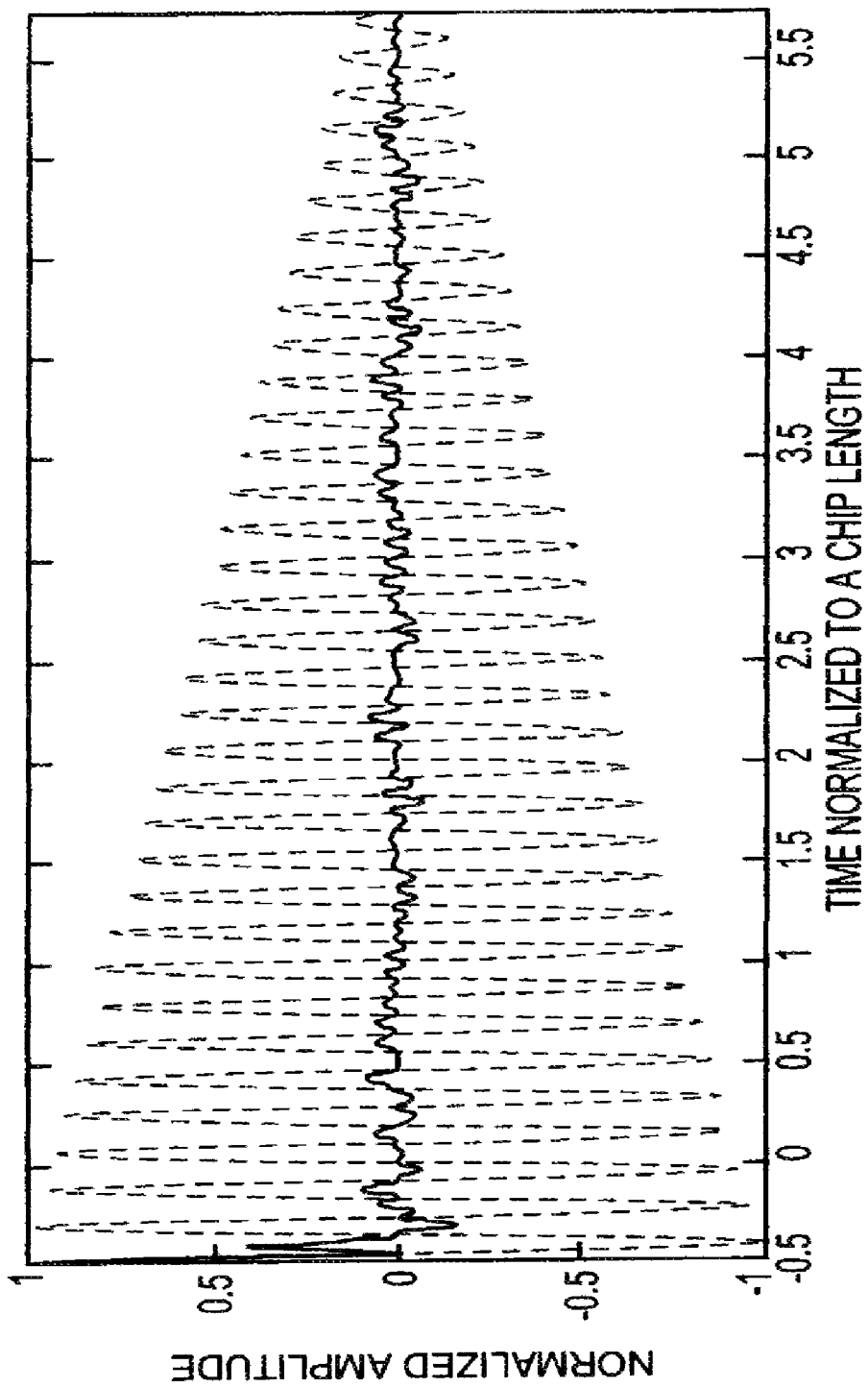
FIG. 5 shows the frequency response of a 7 chip PN-OFC signal and a single carrier signal.

FIG. 5 compares the waveforms of the frequency response of a 7-chip PN-OFC represented with a solid line and a single carrier pseudo noise signal represented with a dashed line. As shown, each has approximately the same time lengths with the magnitudes normalized to the time amplitude peak of the pseudo noise response. The PN-OFC has an increased processing gain and a narrower compressed pulse peak over just the pseudo noise sequence, proportional to the bandwidth spreading of the OFC.

For the purpose of the following analysis, the OFC design is similar to the OFC design principles described in co-pending patent application Ser. Nos. 11/508,674 filed on Aug. 23, 2006, 11/521,708 filed on Sep. 15, 2006 and 11/703,377 filed on Feb. 16, 2007 each having the same assignee as the subject application and having a common inventor which are incorporated herein by reference. The orthogonal frequency coded device center frequency is assumed at approximately 250 MHz. The chip reflector for device discussion has 25 electrodes at 250 MHz which yields a chip time length of approximately 100 nsec. The chip time length maintains a near Rect function in time and Sampling (Sa) function in the frequency domain when implemented on the surface acoustic wave device. The actual SAW velocity is modified, depending on the metal pattern of the surface, as the surface acoustic wave propagates from transducer to the reflector and back.

For the following analysis and calculation the free surface SAW velocity is assumed at 3488 m/sec. The chip null bandwidth is 20 MHz and the chip bandwidth is approximately 10 MHz. These numbers are typical of the co-pending patent application, but are not critical. The code analysis assumes that the ideal chips are good approximations to the SAW chips. This has been verified experimentally for chip reflector lengths less than approximately 50 electrodes on YZ LiNbO$_3$. The chip lengths are variable, dependent on many device and system parameters. The following code analysis plots are scaled to chip lengths to provide a near universal analysis. As chip lengths, bandwidths, center frequencies, etc. vary, the code simulations are still valid with proper scaling.

For purpose of discussion the operating temperature range is assumed as 30° C.+/−50° C. which yields a 100° C. temperature range. For YZ LiNbO$_3$, the temperature coefficient of delay (TCD) is approximately 96 ppm/° C. over the temperature range, with a total temperature coefficient of delay change of approximately 9600 ppm. At 250 MHz, this translates to a maximum frequency shift of approximately 250× 9600=2.4 MHz, or +/−1.2 MHz from the nominal center frequency over the temperature limits.

For this analysis, the range is limited to approximately 5 meters with a variation of +/−1 meter. The round trip electromagnetic delay time at 5 meters is approximately 34 nsec and a one meter variation yields a 6.8 nsec tie variance. The nominal range is not important for coding but is important for system range because it changes the received target signal power variation and also changes the delay at the receiver. For the current analysis, it is assumed that the range of the tags is identical.

The SAW tag, matching and antenna response is a function of several components. All of these components compose the sensor target. The complete impulse frequency response of the target is given by the product of the transfer functions as $$H_{Target}(f)=(H_{Antenna}(f) \cdot H_{Matching}(f) \cdot H_{SAW\_prop}(f) \cdot e^{-i\omega TD} \cdot H_{Transducer}(f))^2 \cdot H_{Reflector}(f)$$

where $\tau_D$ corresponds to the delay between the transducer and the reflector. If it is assumed that the antenna and matching circuits are broadband and have no significant effect on the target transfer function, then the three component transfer functions of interest in the design are the propagation delay, the transducer and the reflector. The total transfer function of interest is given by $$H_{Total}(f)=(H_{prop}(f) \cdot e^{-i\omega TD} \cdot H_{Transducer}(f))^2 \cdot H_{Reflector}(f)$$

In general, the reflector and transducer can both be coded and the delay within the transducer and reflector, modifying both chip and bit sequences, can vary. This report assumes the transducer has an ideal frequency response of unity over the bandwidth of interest.

For the SAW, passive wireless sensor scenario, it is assumed that a number, $N_{sensor}$, of devices are responding to the interrogation signal at some minimum energy level. Over a measurement interval, the device outputs are assumed stationary in time. It is assumed that each tag has the same device parameters, except for the actual device code, and that each re-transmitted signal is at the same level. Therefore, once activated by the interrogation signal, each tag can be considered as a mini-transmitter having a given signal format and level.

At the receiver, each sensor signal is summed at the antenna yielding a single input signal to the receiver. The consequence of this summing at the antenna input is that all overlapping chips in time, from the sum of all sensors, are no longer distinguishable from each other. If the chips were all synchronous in time and all had the same chip carrier frequency, then the sum would be a random chip signal having a wide range of amplitudes and whose phase could be arbitrarily 1 or −1.

As a simple example, if a CDMA code set is assumed having only two codes, and if the two codes at an overlapping chip interval were +1 and −1, respectively, then the signal energy present at the antenna is zero. If the signal amplitudes are the same, then the sum is 2, again the wrong answer for the desired signal chip. This results in a complete loss of chip information over this interval. When correlating against this chip, the result is completely ambiguous. With one chip in a sequence this would not be a grave problem, but if many chips are overlapping from many sensors the correlation signal is soon lost. Given a large number of chips and sensors, the results can either be simulated or statistically determined, but doing a complete code set analysis are impossible within reasonable and given time constraints.

With an orthogonal frequency code set, the problem of chip overlap is reduced since there is both frequency and PN code diversity. Chips overlapping from two sensors are generally at different orthogonal frequencies and the signal energy information should be maintained, unless the two sensors have the same chip frequency in the time interval.

The co-inventors have been researching different approaches to a multi−tag/sensor system; most of which do not allow plural tags to be interrogated at one time. Approaches to just coding algorithms has been marginally fruitful. Over the course of the research it was concluded that the previous energy arguments provide a physical barrier, with expected limits. Given the complexity of coding, sum of codes, and auto−and cross-correlation effects, the multi−parameter space seems extremely large and intractable. It is accepted that the energy limitation as the prime parameter for a multi−sensor, passive coded tag design and have focused on means for overcoming the energy barrier, at least over some specifications.

The co-inventors have previously published results showing that the cross correlation between differing OFC frequency chips yield lower correlation sidelobes, this is an important plus over normal CDMA. The use of both frequency division (FD) between tags and time division (TD) of chips in tags were also discussed. Both of these approaches were considered since each provides greater diversity of coding in a multi−sensor system. Both approaches also provide some measure of orthogonality, based on implementation technique, over and above that of just orthogonal frequency coding. Experiments have shown that the present invention works for at least 32 tags, for example and not limitation. The analysis assumed all tags of equal signal strength, having a known position, and all at the same absolute range. This is the initial scenario at which the tags must be identifiable. The approach uses what the co-inventor call block−TD (BTD) coding of the multi−tag code system.

Figure 7:
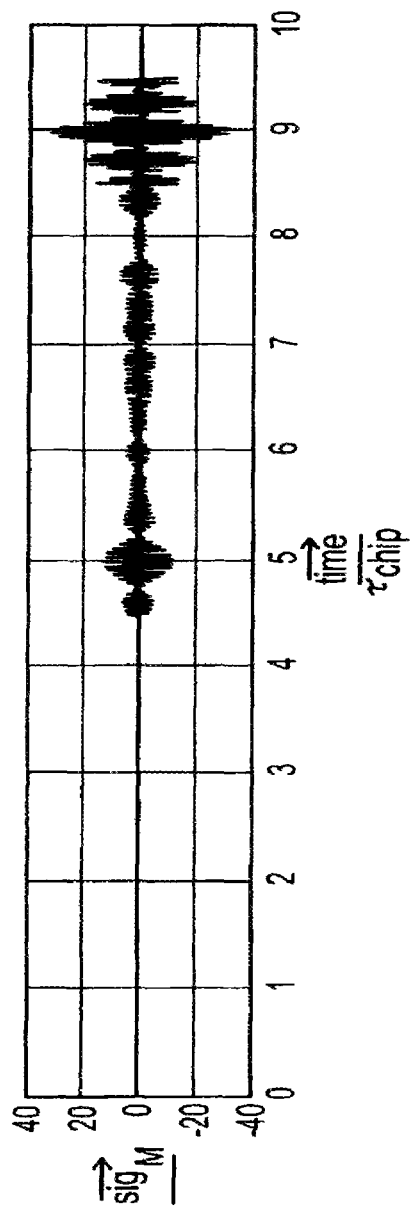
FIG. 7 is a plot showing the sum of all orthogonal frequency and pseudo noise codes as seen by the antenna.

To discuss the key points in consideration, a 5 chip, 32 tag, multi−sensor system is assumed for purpose of the example. The first case shows the results of the 32 tags having differing randomly generated OFC−PN codes without bit transmission delay (BTD) applied. All tags are assumed to have identical delay offsets (approximately 4.5 chips for the case below and is arbitrary). The tags each have 5 OFC chips starting at the same relative time and having the same exact lengths, however, the PN sequence and OFC sequence vary. The plot shown in FIG. 7 is the sum of all codes as seen at the antenna. The time delay offset is completely arbitrary and was set for convenience of plotting. The signal length is 5 chips since all codes arrive simultaneously in time at the antenna. The signal looks like noise, as expected, over the expected time duration.

Figure 8:
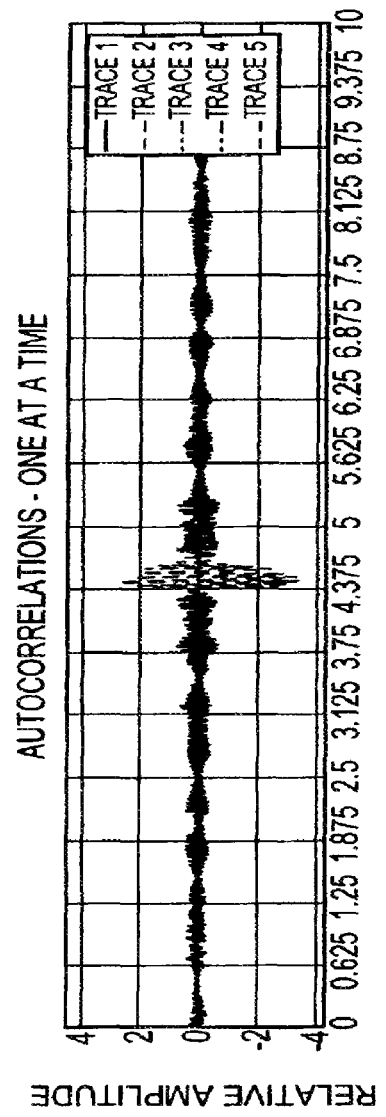
FIG. 8 is a plot showing the superposition of the auto correlation peaks, one at a time.

The plot shown in FIG. 8 is the superposition of the 5 correlation peaks, again all occurring at the same time as expected. The peaks fall onto each other and the sidelobes are slightly different, but not of interest. The time length is 5 chips, as expected.

Figure 9:
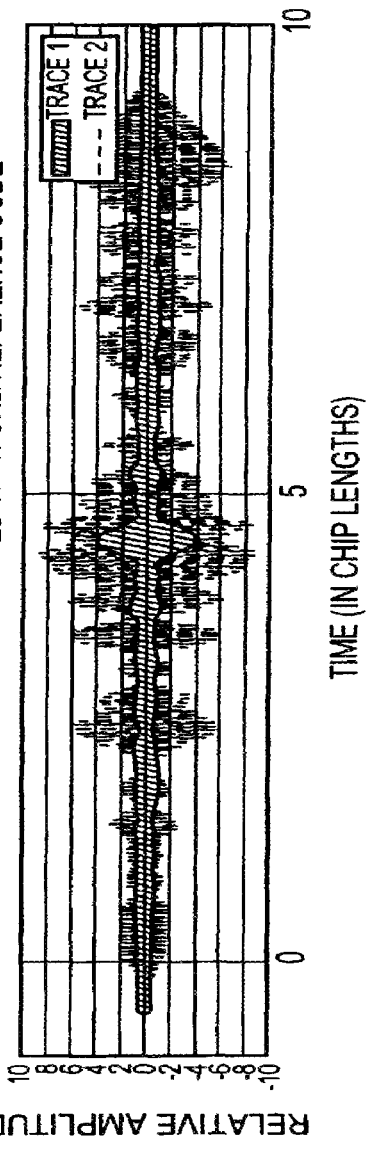
FIG. 9 is a plot showing the autocorrelation of a desired tag and the cross-correlation of the desired tag with the sum of the other tags.

The plot shown in FIG. 9 is the autocorrelation of a desired tag (bold line), and the cross correlation of the desired tag with the sum of all other tags (dashed line). As is evident, there is no discernable autocorrelation peak and it is clearly below the cross-correlation "noise". This is a simple demonstration of the problem to be solved.

Our conclusion is that there must be time diversity, in addition to the OFC diversity, in the system. The problem is that the cross−correlation is stationary over a range of measurement cycles, but unpredictable. Therefore, a way to reduce the cross−correlation "noise" due to multi−codes is to reduce the number of tags, eliminate the cross correlation effect one tag at a time, and/or spreading the system tag energy in time. The following description focuses on spreading the system tag energy in time.

For bit transmission delay, the total number of tags is treated as a complete system and then the system is optimized as a whole. The most critical issue is the minimization of the cross-correlation noise and not be overly concerned about the auto−correlation characteristics, at least to first order. The realization is that the cross−correlation noise is the primary factor limiting the number of OFC tags in a passive wireless multi-sensor system and optimization of a single or a few channels does not result in a good overall system.

Figure 10:
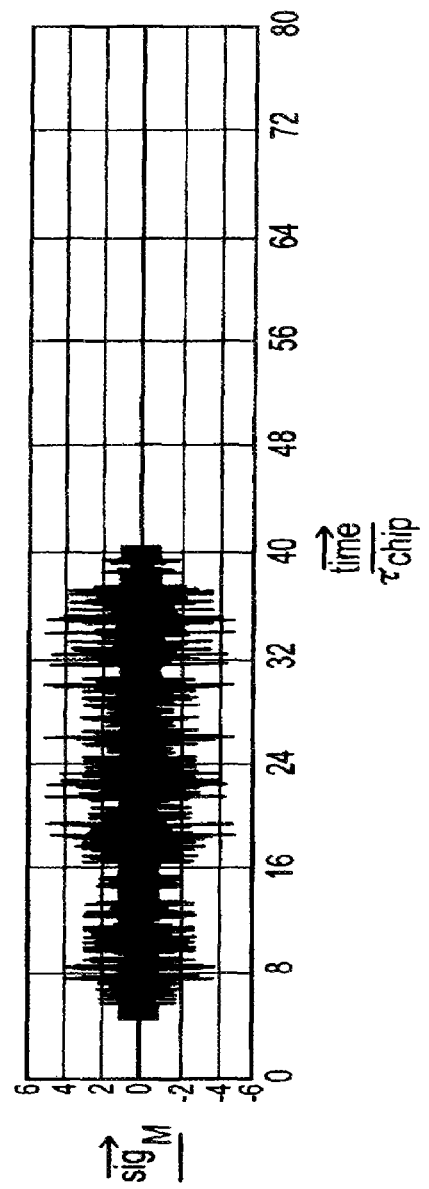
FIG. 10 is a plot showing the sum of all tag responses at the antenna.

For this bit transmission delay example, each OFC−PN code is offset by 1 chip length in time. This has the effect of reducing code collisions for the ensemble, but lengthens the overall system time length, as shown in FIG. 10. The system time length is now 36 chips long. The time delay offset is arbitrary, but for this example, the idealized device time length is approximately 10 chips long in time, the last device is 43 chips long, with the last 5 chips having the code and the rest is propagation delay. The time diversity spreads the tags ensemble energy in time, thereby reducing the time energy density. This is accomplished, however, at the expense of longer delays in devices, which translates to longer SAW devices.

Figure 11:
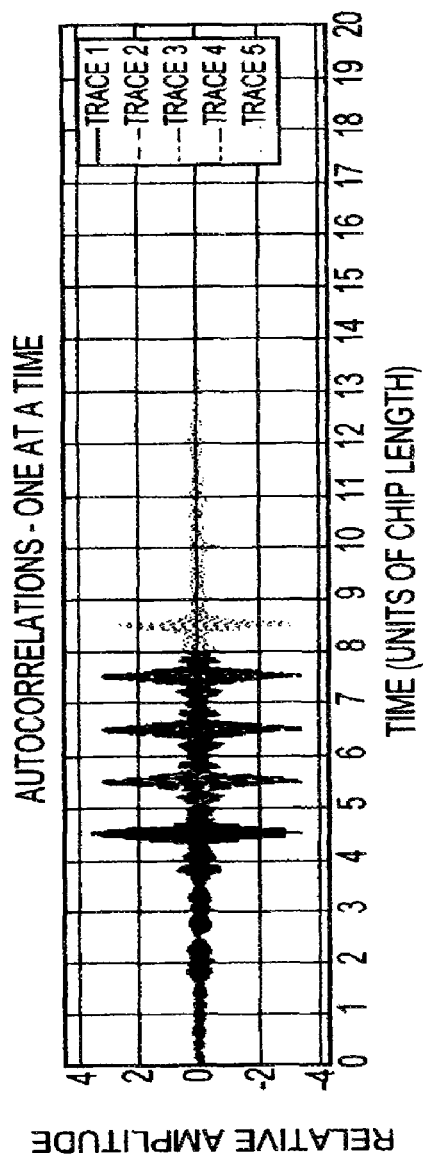
FIG. 11 shows the autocorrelations of the five shortest time-delay tags.

The sum of all tag responses at the antenna is shown in the plot of FIG. 10. Similar to the case before, the time response appears as noise, however, the time response is longer than the previous case, as expected. The autocorrelations of the five shortest time−delay tags are shown in FIG. 11. As expected, the autocorrelations no longer overlay in time, but are separated by 1 chip time length. The time delay offset effectively moves the peak autocorrelation into a time bin approximately 1 chip wide. This time domain orthogonality allows unambiguous detection if the cross−correlation noise is at an acceptable level, so long as the autocorrelation peak does not move outside its time bin due to environmental changes or large changes in range.

Figure 12:
FIG. 12 is a plot showing the complete correlated signal of tag 16 will all of the other tag present.

The plot shown in FIG. 12 is the complete correlated signal of tag 16, with all other tags present. The ideal predicted auto−correlation (bold−line) highlights the expected height and position of the desired response and the ensemble response (dashed−line) has a correlation peak at the desired position. It is noteworthy that if the position of the desired correlation were unknown, it would not be possible to discern which time peaks to choose. The time orthogonality of the BTDM system allows proper detection of the desired signal.

Figure 13:
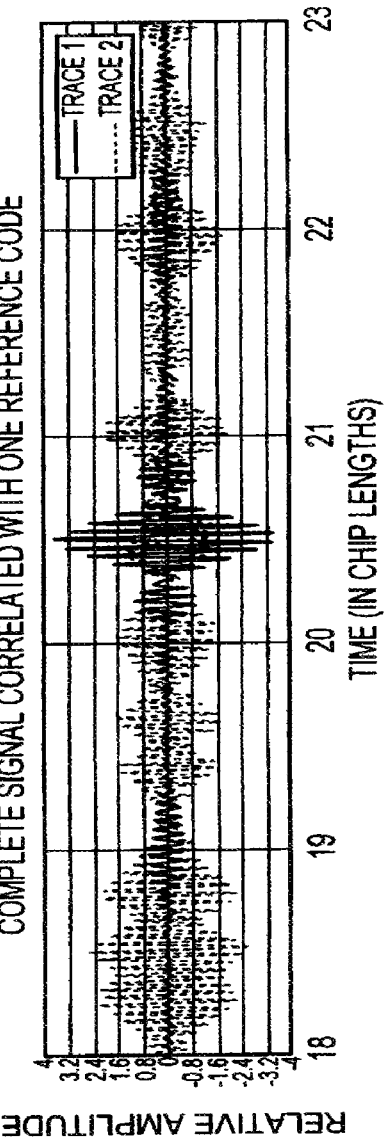
FIG. 13 is a more detailed plot of the correlation region with one reference code.

A more detailed plot of the correlation region is shown in FIG. 13. The peak pulse is as expected, although the cross correlation peaks are nearly as large which may not be desirable. However, compared to the previous example, the correlation is certainly discernable.

Figure 14:
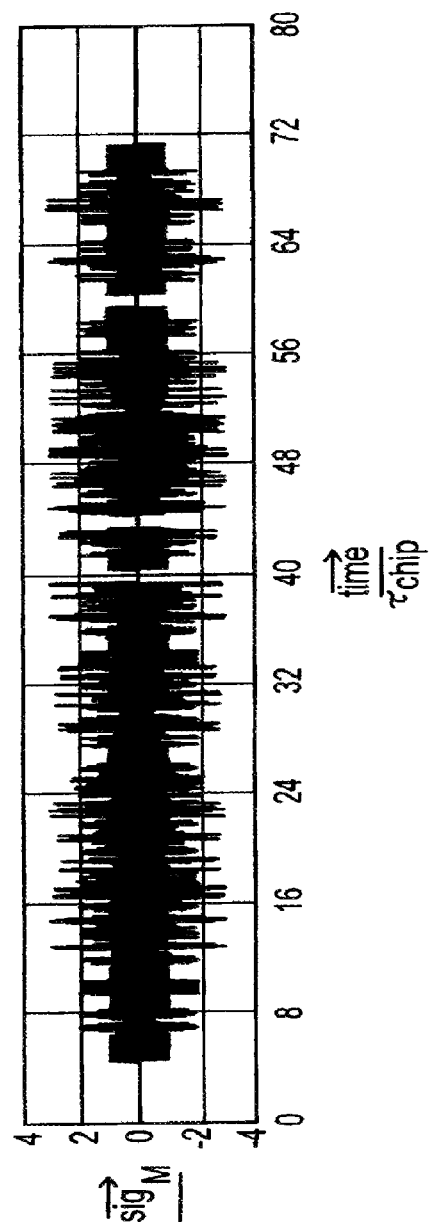
FIG. 14 is a plot showing the sum of the ensemble tag response.

The last example is where a two chip offset BTD, having the same other parameters as previously discussed, was considered. The sum of the ensemble tag response is shown in FIG. 14. Note that there are quite zones where the sum of all chips is zero due to energy summing to zero from the chip ensemble, as a possibility previously discussed. The ensemble time length is now 67 chips long.

Figure 15:
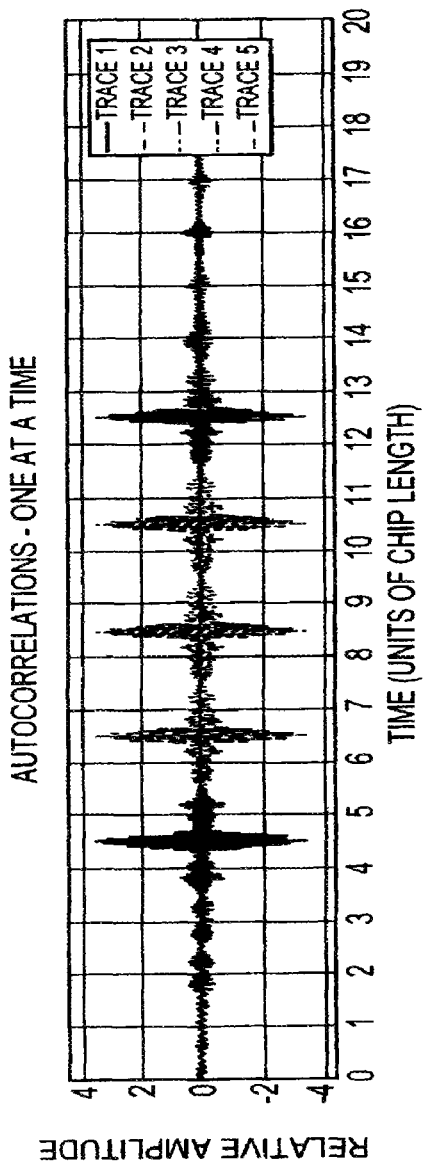
FIG. 15 is a plot showing the autocorrelations, one at a time.
Figure 16:
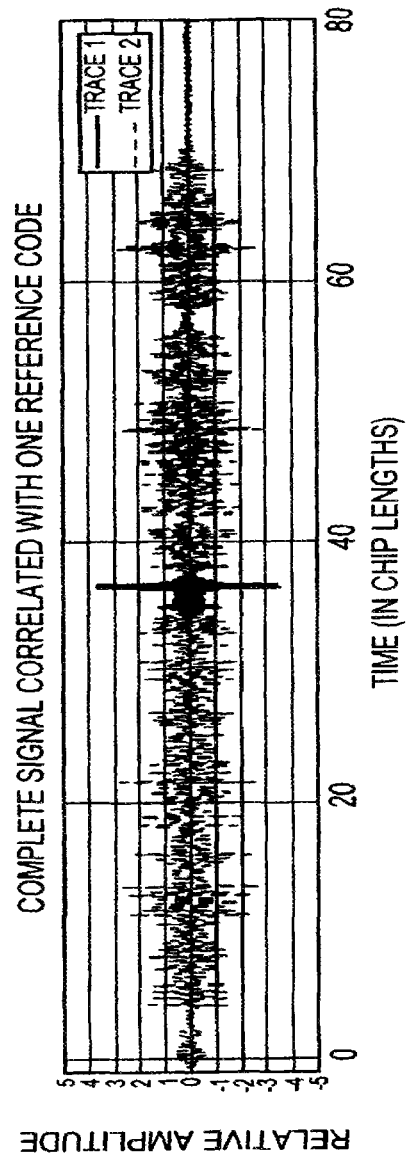
FIG. 16 is a plot showing the complete signal autocorrelation of tag 16 with one reference code.
Figure 17:
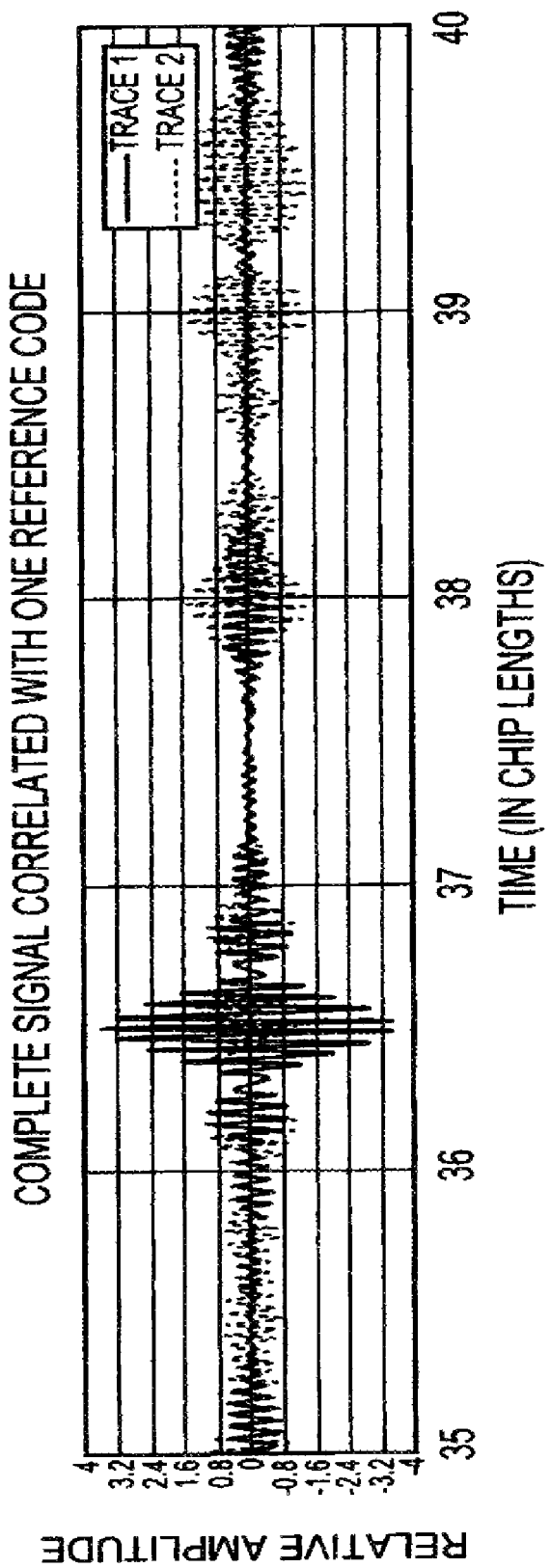
FIG. 17 is a plot showing the complete signal correlated one reference code

The autocorrelations of the first five chips shown in FIG. 15 are further separated when compared to the previous example. The autocorrelation (bold line) and correlation of tag 16 with the ensemble (dashed line) are shown in FIGS. 16 and 17. The predicted correlation looks good; the difference in amplitude is due to the chip interactions reducing the energy of the correlation process.

In summary, the previous examples show that a 32 tag system, with 5 OFC chips, using a 2 chip delay TD OFC PN sequence works well at room temperature. The distance between tags should allow operation over at least 100° C. changes in temperature and at least +/1 range deviation.

On a YZ LiNbO$_3$ substrate, assuming a 100 nsec chip length, the longest code plus offset delay distance is approximately 28 mm. Based on this current analysis, it is recommended that at least a 2 chip offset be used since it gives little autocorrelation pulse distortion and has reduced time energy density.

The previous examples showed the results of a 5 chip TDD scheme. It is obvious that this can be extended to any number of chips. Also, although the chips were placed in time slots, such that all OFC chips in a given device are contiguous in time, this is not necessary. The TDD scheme can be extended so that the chips have time slots where there is no energy between chips. Based on the previous arguments, it is only necessary that the autocorrelation peaks are separated by an acceptable design difference in time. It is also obvious that this can be extended to POFC or other similar frequency diverse coding structure. This technique can be extended by using FDD techniques, such as band limiting sets of tags with respect to others, removing one or more adjacent OFC chip frequencies, etc.

The following calculates the total ideal impulse response length of a general TDD system with a given time offset.
Define:
$\tau_c$=chip time length
$\tau_{offset}$=offset time delay
$\tau_{system}$=system time length for all coded RFID devices
  $N_C$=number of chips in code
  $N_{codes}$=number of RFID codes devices in the system
  $f_o$=system center frequency
  BW=chip bandwidth
  $BW_{sys}$=total OFC system bandwidth ($BW_{sys}=N_C \cdot BW_c$)
  % BW=$BW_{sys}/f_o$
The total system ideal time length for all RFID devices is given as $$\tau_{system}=\tau_c \cdot [N_c+(\tau_{offset}/\tau_c)\cdot(N_{codes}-1)]$$

or $$\tau_{system}=1/BW_{sys} \cdot [N_c^2+(\tau_{offset}/\tau_c)\cdot(N_{codes}-1)]$$

As an example, if the number of OFC chip frequencies is 5 and they are contiguous within a block of time, there are 32 codes, and there is a time offset of 2-chip lengths, then the system ideal time length is $$\tau_{system}=\tau_c \cdot [5+2\cdot(32-1)]=67\tau_c$$

There are many variations of the TDD approach to surface acoustic wave coding. The following are examples provided to illustrate different approaches although the examples are not exhaustive, they do show some of the properties of different TDD approaches.

The vehicle chosen for the example is a 5-chip OFC with 8 codes in the system. A device chip sequence is given in each row, and the first column represents the beginning of the device with the shortest implemented delay. Tables are used for the illustrations. Each array element in the table is assumed to be a chip length in time. The chips are numbered 1 through 5 and represent place holders; not any particular OFC frequency or phase. The delay offsets are in units of an integer chip length since it makes the illustrations easy to view, but from the above calculations they are not required to be an integer chip length.

There are several competing considerations: 1) minimize code collisions and the sum of all energy at any given time from all codes, 2) be able to detect the auto-correlation peak without error under all system operational conditions, and 3) keep device lengths short or at least realizable for implementation in the SAW device embodiment. These are generally competing requirements where optimizing one will tend to exasperate the other. All the examples show the thermal equilibrium condition which is ideal.

The first example shown in table 1 below is a system without time delay offset.

| 1 | 2 | 3 | 4 | 5 |
|---|---|---|---|---|
| 1 | 2 | 3 | 4 | 5 |
| 1 | 2 | 3 | 4 | 5 |
| 1 | 2 | 3 | 4 | 5 |
| 1 | 2 | 3 | 4 | 5 |
| 1 | 2 | 3 | 4 | 5 |
| 1 | 2 | 3 | 4 | 5 |
| 1 | 2 | 3 | 4 | 5 |

All of the codes have the same minimum delay which aligns all of the chips in each column, producing a code sum of 8 for all time chip slots. In fact, as the number of codes increases, the code sum in all columns is always equal to the number of codes present, which optimizes code overlap and code collisions. The autocorrelations lies at the same point in time. In general, this is a worst case scenario unless the number of codes is small. In general, code diversity does not provide enough processing gain to overcome the cross-correlation energy of the sum of all codes with the desired code. However, the time response of the entire system is only 5 chips long, making all devices small and the system time window of interest (TWI) small.

| 1 | 2 | 3 | 4 | 5 |   |   |   |   |   |   |   |
|---|---|---|---|---|---|---|---|---|---|---|---|
|   | 1 | 2 | 3 | 4 | 5 |   |   |   |   |   |   |
|   |   | 1 | 2 | 3 | 4 | 5 |   |   |   |   |   |
|   |   |   | 1 | 2 | 3 | 4 | 5 |   |   |   |   |
|   |   |   |   | 1 | 2 | 3 | 4 | 5 |   |   |   |
|   |   |   |   |   | 1 | 2 | 3 | 4 | 5 |   |   |
|   |   |   |   |   |   | 1 | 2 | 3 | 4 | 5 |   |
|   |   |   |   |   |   |   | 1 | 2 | 3 | 4 | 5 |

Table 2 corresponds to the second example 2. In this example, each code has been offset by a minimum of 1 chip length with respect to all other codes. As shown, the first code has no offset, the second code has a one chip length offset, the third code has a two chip length offset, and so on. The sum of all codes within any column is always less than or equal to 5, which is true regardless of the number of codes. This can be an enormous decrease in code collisions and code overlap as the number of system codes increases. The autocorrelation of each code occurs in a unique time slot with the next nearest autocorrelation being 1 chip away. This should make signal detection easier and more accurate. The disadvantage of this approach compared to the first example is that the system time window of interest is longer and the length of the longest device is 7 chips more than the shortest device.

The table for example 3 is shown below.

| 1 | 2 | 3 | 4 | 5 |   |   |   |   |   |   |
|---|---|---|---|---|---|---|---|---|---|---|
|   | 1 | 2 | 3 | 4 | 5 |   |   |   |   |   |
|   |   | 1 | 2 | 3 | 4 | 5 |   |   |   |   |
|   |   |   | 1 | 2 | 3 | 4 | 5 |   |   |   |
|   |   |   |   | 1 | 2 | 3 | 4 | 5 |   |   |
|   |   |   |   |   | 1 | 2 | 3 | 4 | 5 |   |
|   |   |   |   |   |   | 1 | 2 | 3 | 4 | 5 |

Here, each code has been offset by a minimum of 2 chip lengths with respect to all other codes. The sum of all codes within any column is always less than or equal to 3, and is true regardless of the number of codes. Similar to example 2, this is an enormous decrease in code collisions and code overlap as the number of system codes increases. The autocorrelation of each code occurs in a unique time slot with the next nearest autocorrelation being 2 chips away. Again, this should make signal detection easier and more accurate compared to example 1 and 2. The disadvantage of this approach compared to example 2 is the system time window of interest is again longer and the length of the longest device is 14 chips more than the shortest device.

The table for example 4 is shown below. In example 4 there is no chip delay offset, 5 chip OFC, 9 chip code, zero coding is allowed.

| 1 |   | 2 |   | 3 |   | 4 |   | 5 |   |   |
|---|---|---|---|---|---|---|---|---|---|---|
|   | 1 |   | 2 |   | 3 |   | 4 |   | 5 |   |
|   |   | 1 |   | 2 |   | 3 |   | 4 |   | 5 |
|   |   |   | 1 |   | 2 |   | 3 |   | 4 | 5 |
|   |   |   |   | 1 |   | 2 |   | 3 | 4 | 5 |
|   |   |   |   |   | 1 |   | 2 | 3 | 4 | 5 |
|   |   |   |   |   |   | 1 | 2 | 3 | 4 | 5 |
|   |   |   |   |   |   | 1 | 2 | 3 | 4 | 5 |

Here, each code has been offset by a minimum of 1 chip length with respect to all other codes. However, the OFC chips are not contiguous in time. The example shows a zero weight time slot between non-zero weight codes. This is just one of many cases where zeros can be included. The sum of all codes within any column is always less than or equal to 4, and is always true regardless of the number of codes. The calculation of system time length is similar to previous cases, with the exception that the code chip length is now 9 instead of 5, even though there are only 5 OFC chips. Similar to example 3, this is a substantial decrease in code collisions and code overlap as the number of system codes increases. The autocorrelation of each code occurs in a unique time slot with the next nearest autocorrelation being 1 chip away. Again, this should make signal detection easier and more accurate compared to example 1. The disadvantage of this approach is the system time window of interest is 16 chips compared to 12 chips for example 2, but is shorter than example 3 which has a TWI of 19 chips.

Example 5 is a semi-chip delay offset, 5 chip OFC, 9 chip code, with zero coding allowed. The table for example 5 is shown below.

| 1 |   | 2 |   | 3 |   | 4 |   | 5 |   |   |
|---|---|---|---|---|---|---|---|---|---|---|
|   | 1 |   | 2 |   | 3 |   | 4 |   | 5 |   |
| 5 |   | 1 |   | 2 |   | 3 |   | 4 |   |   |
|   | 5 |   | 1 |   | 2 |   | 3 |   | 4 |   |
| 5 |   | 4 |   | 1 |   | 2 |   | 3 |   |   |
|   | 5 |   | 4 |   | 1 |   | 2 |   | 3 |   |
| 5 |   | 4 |   | 3 |   | 1 |   | 2 |   |   |
|   | 5 |   | 4 |   | 3 |   | 1 |   | 2 |   |

In the previous examples, the code was offset by 1 chip length with respect to the shortest code delay and the OFC chips are not contiguous in time. The fifth example shows a zero weight time slot between non-zero weight codes, as in example 4. The sum of all codes within any column is always less than or equal to 4, and is dependent on the number of codes. The calculation of system time length differs from previous examples in that the code chip length is now 9 instead of 5, even though there are only 5 OFC chips, and the time window of interest is only 10 chips long. There are a maximum of 4 chip overlaps in any column (time slot) for this case of 8 codes, but this number increases as the number of codes increases. The acceptable levels of code energy in any time slot must be considered for the system. The autocorrelation of each code occurs in the same time slot which means code diversity is crucial for accurate, error-free detection. An advantage is that with this 8 code set, every device has the same length and the overall system length is only 10 chips; only twice as long as example 1.

The next example illustrates the use of code redundancy. Given the previous examples, it is possible in many cases to reuse codes when TDD is implemented. The table below shows the case where there are 4 different codes which are each reused twice.

| 1 | 2 | 3 | 4 | 5 |   |   |   |
|---|---|---|---|---|---|---|---|
|   | 5 | 4 | 3 | 2 | 1 |   |   |
|   |   | 2 | 4 | 1 | 3 | 5 |   |
|   |   |   | 5 | 3 | 4 | 2 | 1 |

-continued

| | 1 | 2 | 3 | 4 | 5 | | |
|---|---|---|---|---|---|---|---|
| | | 5 | 4 | 3 | 2 | 1 | |
| | | | 2 | 4 | 1 | 3 | 5 |
| | | | | 5 | 3 | 4 | 2 | 1 |

The autocorrelation peak of the first and fifth codes occurs in slots 3 and 7, respectively. These are well separated in time and therefore do not interfere. The use of optimized code sets is simplified since an optimized set can be reused. An important advantage to such a scheme is that multiple tags can be auto-correlated at one time which can reduce processing complexity and time at the receiver. This approach can be used in conjunction with many of the previous examples.

The present invention introduces cell-based coding for OFC devices. The idea of this approach is to take a set of OFC devices and spread chips in time in such way that the same frequency chips have minimal number of same frequency overlaps in a given time slot. This can be represented as a matrix M×N, where N is number of locations where chips can be, and M is number of codes needed. If we have n chips per OFC device and we desire to have m overlapping chips (with or without same-frequency overlaps), N can be expressed as M, n and m, as shown in Eq. (1).

$$N = \operatorname{ceil}\left(\frac{n \cdot M}{m}\right) \quad (1)$$

In case of OFC devices all of the chips are orthogonal to each other at their respective center frequencies; therefore, the most efficient way to overlap the chips is when m=n, then N=M.

Figure 18:
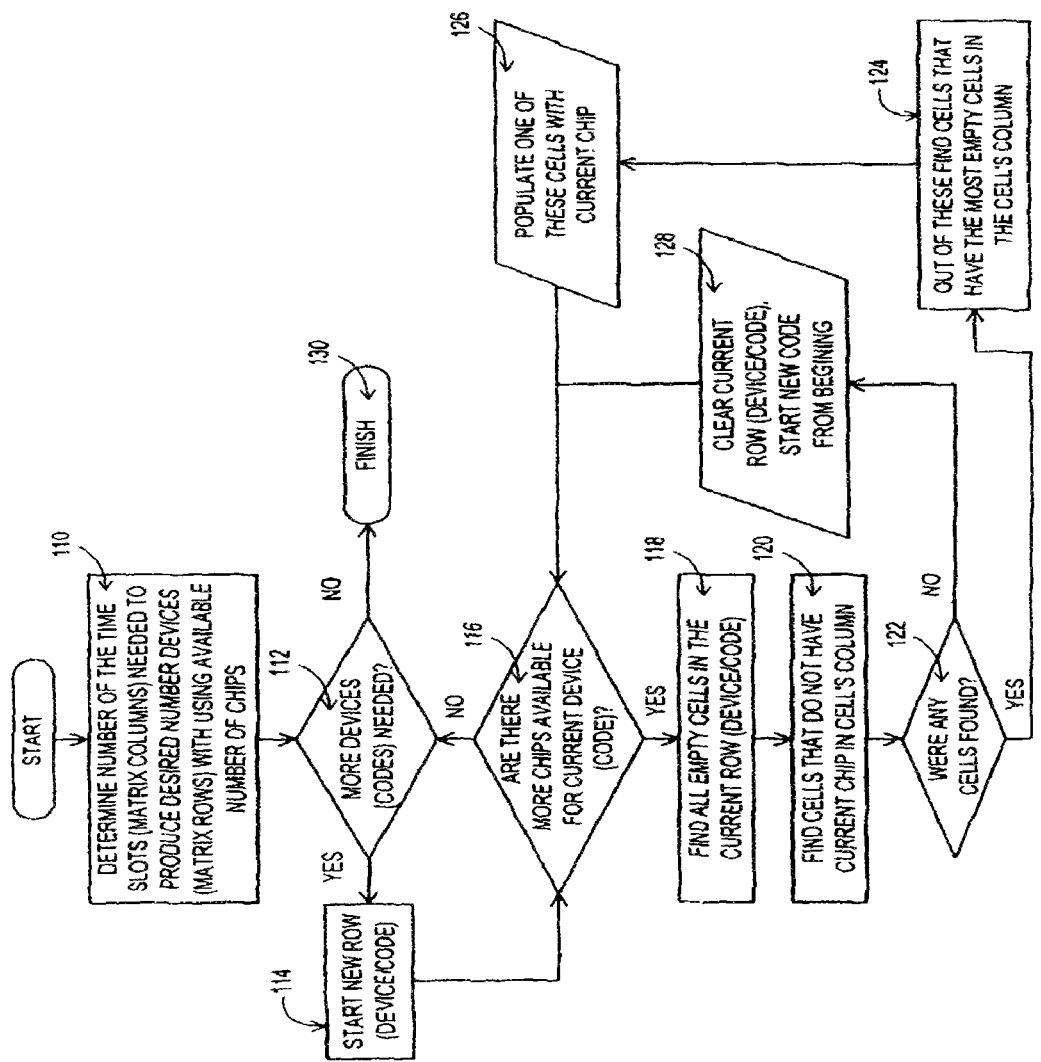
FIG. 18 is a flow diagram showing steps of the algorithm for semi-randomly populating a matrix by produce codes using orthogonal frequency coded chips.

When populating this M×N matrix with OFC chips, it is important to keep in mind that each one of the frequencies can only be used once per column. Each chip is typically used once for every OFC device. The algorithm for populating such a matrix with codes is shown in FIG. 18. As shown, the instructions start with determining the code matrix dimensions of the code matrix M×N in step 110. As previously described, the code matrix is determined by the number of OFC devices M in the multi-tag system, number of locations N chips can populate, number of chips n per OFC device, and the number of overlapping chips m allowed.

Once the dimensions of the matrix are determined, the matrix is populated. In steps 112 and 114, respectively, the first code and first chip in the code is retrieved the cells of the current code that are not assigned a chip are determined in step 116. Based on the cells located in step 116, the columns corresponding the located cells are searched in step 118 to locate columns do not already contain the same chip. Once the columns are located, it is determined in step 120 which column is already populated with the least number of chips. If a cell is found in step 122, the cell is populated with the chip in step 130. If a cell is not located in step 122, the columns are searched to find the column with the second smallest number of chips is determined in step 124. In step 126 it is determined if a column was found, and if a column is located the cell is populated in step 130. In the event that a column is not located in step 126, an error message is generated in step 128.

After a cell is populated with the chip in step 130, it is determined in step 132 if it was the last chip in the code. If it was the last chip, in step 140 it is determined if it is the last code in the code set. If it was the last code in the code set, then the process is complete and the resulting populated matrix is returned in step 144. If it is not the last code in the code set, the next code is found in step 150 and the first chip found in step 114, repeating the steps until an error occurs or the matrix cells are fully populated.

During experiments, the algorithm was run many times and never returned an error message or an invalid code set. Thus, it seems that a valid solution is produced at all times. In an event when algorithm returns an invalid code set or an error, it can be re-run until it produces a desired outcome.

An example of 16 codes is shown in the next Table 7.

| 0 | 0 | 7 | 5 | 3 | 0 | 0 | 0 | 6 | 0 | 0 | 2 | 0 | 1 | 0 | 4 |
|---|---|---|---|---|---|---|---|---|---|---|---|---|---|---|---|
| 4 | 5 | 0 | 0 | 0 | 2 | 6 | 7 | 0 | 1 | 3 | 0 | 0 | 0 | 0 | 0 |
| 5 | 4 | 3 | 6 | 0 | 0 | 0 | 0 | 0 | 0 | 7 | 0 | 1 | 0 | 2 | 0 |
| 0 | 0 | 0 | 0 | 5 | 0 | 1 | 3 | 0 | 2 | 0 | 0 | 6 | 4 | 0 | 7 |
| 0 | 0 | 0 | 0 | 0 | 3 | 0 | 5 | 2 | 7 | 0 | 1 | 0 | 6 | 4 | 0 |
| 7 | 0 | 4 | 3 | 1 | 6 | 2 | 0 | 0 | 0 | 0 | 0 | 0 | 5 | 0 |
| 0 | 6 | 0 | 0 | 0 | 7 | 0 | 0 | 1 | 0 | 5 | 3 | 4 | 0 | 0 | 2 |
| 2 | 7 | 1 | 0 | 6 | 0 | 3 | 0 | 0 | 0 | 4 | 0 | 5 | 0 | 0 |
| 0 | 0 | 0 | 0 | 0 | 0 | 0 | 4 | 3 | 5 | 6 | 0 | 2 | 0 | 7 | 1 |
| 0 | 0 | 0 | 1 | 2 | 5 | 7 | 0 | 0 | 4 | 0 | 6 | 0 | 0 | 3 | 0 |
| 0 | 3 | 6 | 2 | 0 | 0 | 0 | 1 | 0 | 0 | 4 | 0 | 5 | 7 | 0 | 0 |
| 1 | 0 | 0 | 0 | 7 | 0 | 5 | 0 | 4 | 0 | 0 | 0 | 0 | 2 | 6 | 3 |
| 0 | 0 | 2 | 4 | 0 | 1 | 0 | 0 | 5 | 0 | 0 | 7 | 3 | 0 | 0 | 6 |
| 6 | 1 | 5 | 7 | 0 | 0 | 4 | 0 | 0 | 3 | 2 | 0 | 0 | 0 | 0 | 0 |
| 3 | 0 | 0 | 0 | 4 | 0 | 0 | 2 | 0 | 6 | 0 | 0 | 7 | 0 | 1 | 5 |
| 0 | 2 | 0 | 0 | 0 | 4 | 0 | 6 | 7 | 0 | 1 | 5 | 0 | 3 | 0 | 0 |

Figure 19:
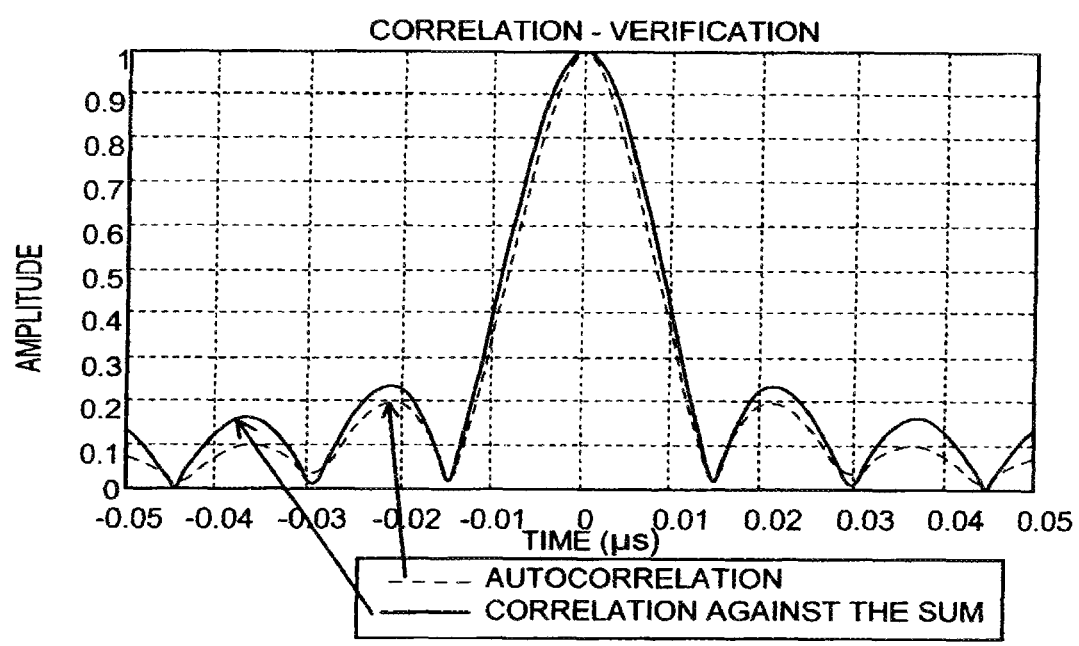
FIG. 19 is a graph showing autocorrelation of the fifth code from Table 7 compared with the correlation to the entire system.

It can be seen in highlighted row 7 and column 8 that each frequency is only used once in each column. Also note that PN coding on top of OFC coding has not yet been applied. FIG. 19 shows the correlation with average performance found of all 16 codes and the autocorrelation of code 5 from the above table compared to correlation to entire system, average performing correlation out of 16 codes.

Figure 20:
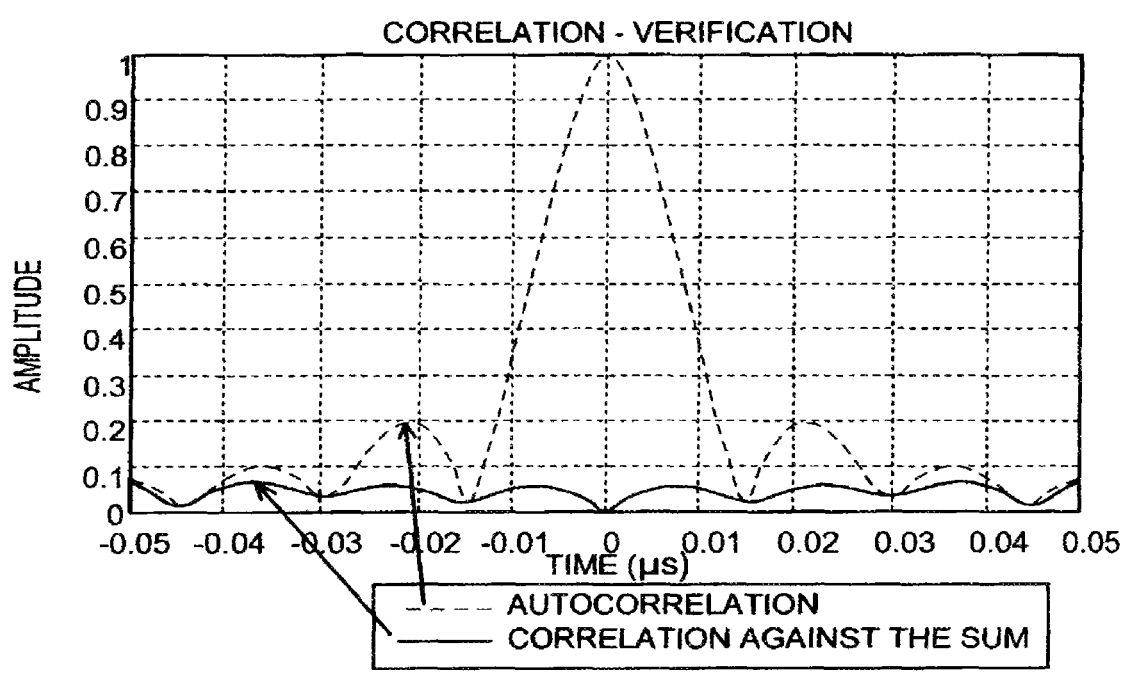
FIG. 20 shows the correlation of code 5 to the entire system with code 5 removed.

FIG. 20 shows correlation of code 5 to entire system with code 5 removed from it. The most important thing to note is that the cross-correlation side lobes shown in FIG. 20 are small, and will remain small if any codes are removed or attenuated.

Figure 21A:
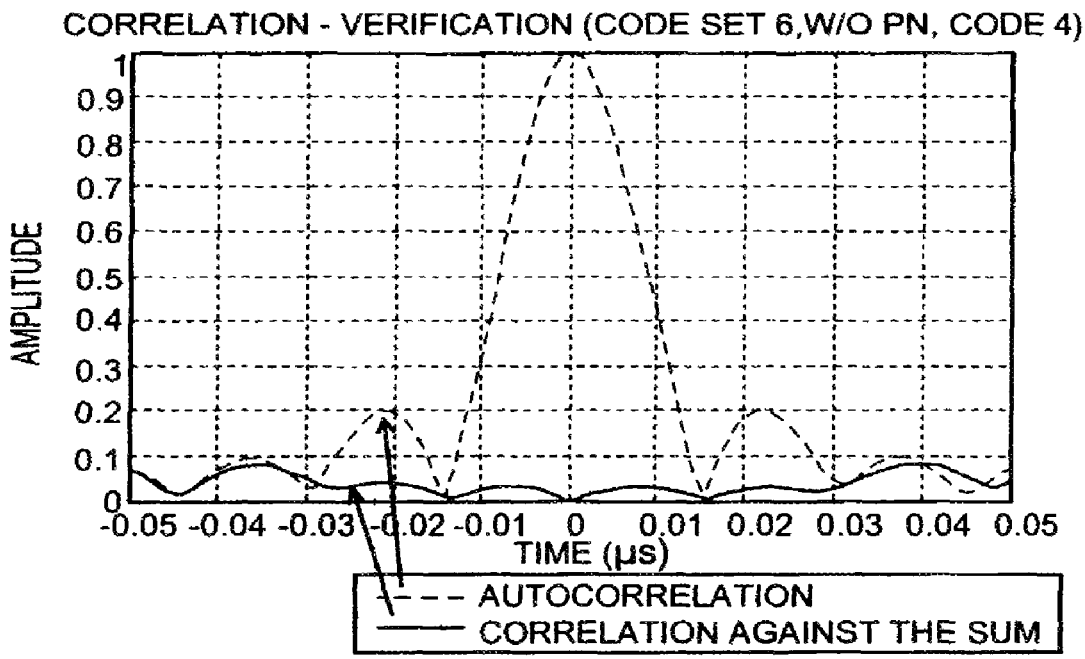
FIG. 21a shows the best performing codes out of the 16 code set shown in Table 7.
Figure 21B:
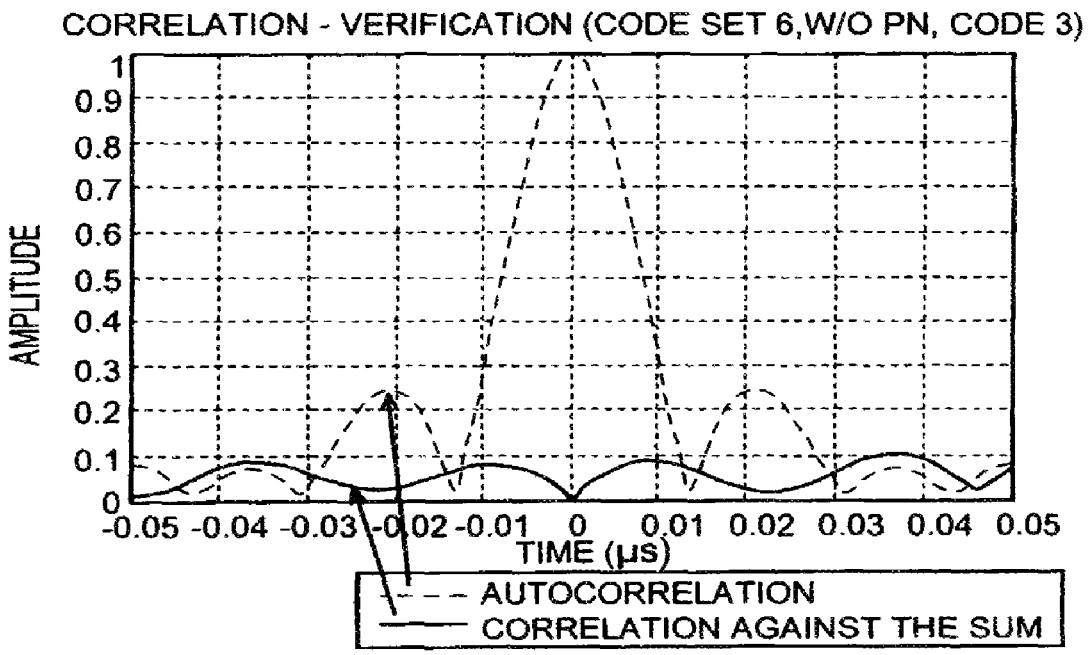
FIG. 21b shows the worst performing codes out of the 16 code set shown in Table 7.
Figure 22:
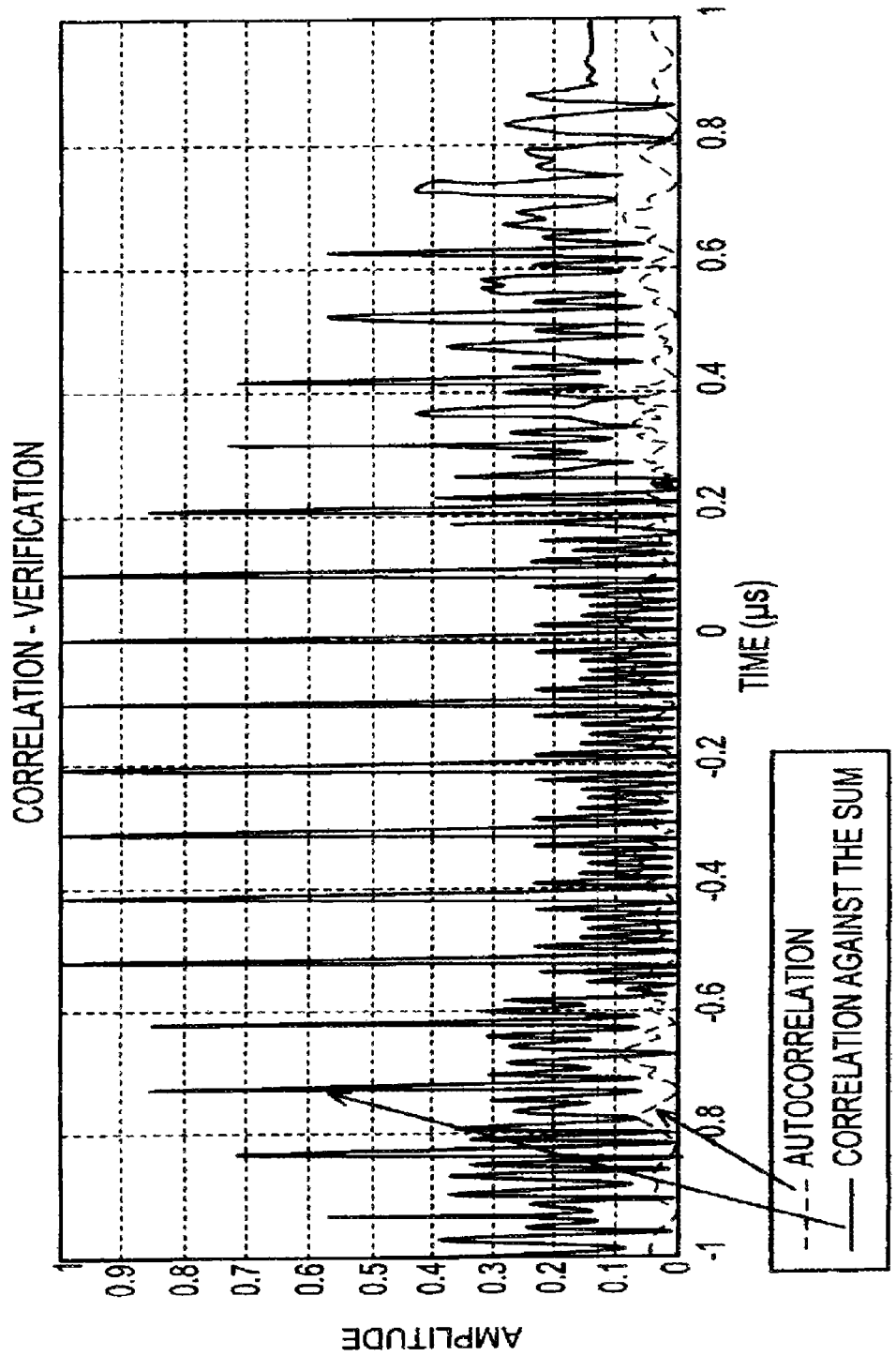
FIG. 22 shows the autocorrelation of code 5 from Table 7 compared to the entire system, and the worst correlation out of 16 codes over a longer time period.

FIGS. 21*a* and 21*b* show the best (a) and the worst (b) performing codes out of the 16 code set. Since any one of the frequencies is present in any one of the columns, when the sliding correlator (matched filter) is applied as it is shifted by a chip length, there are always chips that it will correlate. The worst case is when all of the chips are in phase; the result will be peaks at every chip length. This effect is shown in FIG. 22. Although the other correlations could be large, as long as the window of interest is smaller, as in FIG. 22, the code detection is accurate. FIG. 22 shows autocorrelation of code 5 from Table 7 compared to correlation to entire system, the worst correlation out of 16 codes over longer time period.

For a sensor, if the peaks start to overlap due to temperature, significant code collision can result. However, based on prior experiments, to even shift by half of a chip length, extreme temperatures are required for most SAW substrates. Table 8 is an illustration of how these false correlations appear.

22, where false correlation peaks decrease in steps of $1/7$ when normalized to the main correlation peak.

Figure 23:
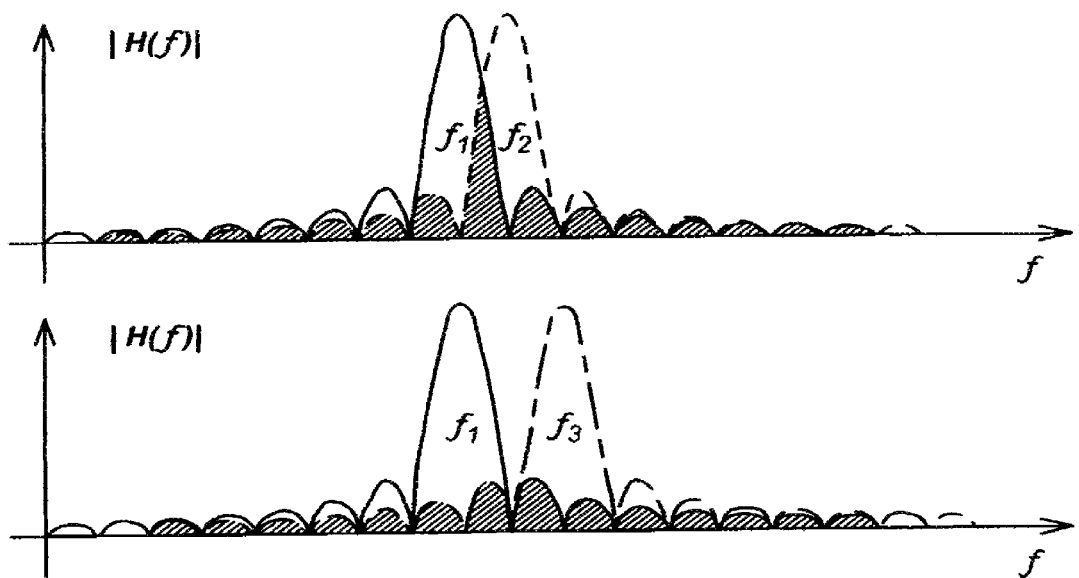
FIG. 23a shows the overlap of the power spectra of adjacent chips ($f_1$ adjacent to $f_2$).
FIG. 23b shows the overlap of the power spectra of chips separated by one chip ($f_1$ and $f_3$).

In regard to frequency diversity of coding OFC Chip, for the general contiguous OFC coding, there is a frequency overlap of between adjacent chips, as shown in FIG. 23. In the case of 7 chip OFC devices, there are 7 frequencies. To reduce the overlap of the power spectra of chips, in each column only non-adjacent chip frequencies are used. As an example, for the 7-chip OFC codes the best that can be done is when four 4 frequencies $f_1$, $f_3$, $f_5$, and $f_7$ are used. If four 4 overlaps are

| | | | | | | | | | | | | | | | | |
|---|---|---|---|---|---|---|---|---|---|---|---|---|---|---|---|---|
| 0 | 6 | 0 | 0 | 0 | 7 | 0 | 0 | 1 | 0 | 5 | 3 | 4 | 0 | 0 | 2 | |
| | 0 | 6 | 0 | 0 | 0 | 7 | 0 | 0 | 1 | 0 | 5 | 3 | 4 | 0 | 0 | 2 |
| | | 0 | 6 | 0 | 0 | 0 | 7 | 0 | 0 | 1 | 0 | 5 | 3 | 4 | 0 | 0 | 2 |
| 0 | 0 | 7 | 5 | 3 | 0 | 0 | 0 | 6 | 0 | 0 | 2 | 0 | 1 | 0 | 4 | |
| 4 | 5 | 0 | 0 | 0 | 2 | 6 | 7 | 0 | 1 | 3 | 0 | 0 | 0 | 0 | 0 | |
| 5 | 4 | 3 | 6 | 0 | 0 | 0 | 0 | 0 | 7 | 0 | 1 | 0 | 2 | 0 | | |
| 0 | 0 | 0 | 0 | 5 | 0 | 1 | 3 | 0 | 2 | 0 | 0 | 6 | 4 | 0 | 7 | |
| 0 | 0 | 0 | 0 | 0 | 3 | 0 | 5 | 2 | 7 | 0 | 1 | 0 | 6 | 4 | 0 | |
| 7 | 0 | 4 | 3 | 1 | 6 | 2 | 0 | 0 | 0 | 0 | 0 | 0 | 5 | 0 | | |
| 0 | 6 | 0 | 0 | 0 | 7 | 0 | 0 | 1 | 0 | 5 | 3 | 4 | 0 | 0 | 2 | |
| 2 | 7 | 1 | 0 | 6 | 0 | 3 | 0 | 0 | 0 | 0 | 4 | 0 | 5 | 0 | 0 | |
| 0 | 0 | 0 | 0 | 0 | 0 | 4 | 3 | 5 | 6 | 0 | 2 | 0 | 7 | 1 | | |
| 0 | 0 | 0 | 1 | 2 | 5 | 7 | 0 | 0 | 4 | 0 | 6 | 0 | 0 | 3 | 0 | |
| 0 | 3 | 6 | 2 | 0 | 0 | 0 | 1 | 0 | 0 | 4 | 0 | 5 | 7 | 0 | 0 | |
| 1 | 0 | 0 | 0 | 7 | 0 | 5 | 0 | 4 | 0 | 0 | 0 | 0 | 2 | 6 | 3 | |
| 0 | 0 | 2 | 4 | 0 | 1 | 0 | 0 | 5 | 0 | 0 | 7 | 3 | 0 | 0 | 6 | |
| 6 | 1 | 5 | 7 | 0 | 0 | 4 | 0 | 0 | 3 | 2 | 0 | 0 | 0 | 0 | 0 | |
| 3 | 0 | 0 | 0 | 4 | 0 | 0 | 2 | 0 | 6 | 0 | 0 | 7 | 0 | 1 | 5 | |
| 0 | 2 | 0 | 0 | 0 | 4 | 0 | 6 | 7 | 0 | 1 | 5 | 0 | 3 | 0 | 0 | |

The green highlighted column (row 2; row 10 columns 2, 7, 9 11-13 and 16) represents the code at equilibrium (ideal). In Table 8, when the code is shifted to the left (row 1, row 11 column 12, row 12, column 10, row 14 column 8, row 15 column 5 and row 17 column 1), each chip of the code aligned with the same frequency chip from one of the other devices. When the code was shifted to the right, the chip with frequency 2 was moved outside of the matrix (row 3); therefore, the false peak at that location is going to be $6/7$ of the main correlation peak, given that reflected wave amplitude is equal for all devices in the system. This can also be observed in FIG.

allowed, from Eq. 1 28 even columns ($_N$) would be needed. The obvious solution to this problem is to create two sets of codes; one that uses only odd frequencies and one that uses only even frequencies. In the first subset m=n=4 and in the second subset m=n=3, for 16 codes two matrices are produced, both matrices are 16×16. When combined, each code becomes 32 cells long, compared to 28 calculated earlier, this sounds reasonable. The table below shows the new code set that has these properties.

| | | | | | | | | | | | | | | | | |
|---|---|---|---|---|---|---|---|---|---|---|---|---|---|---|---|---|
| 0 | 6 | 0 | 0 | 0 | 0 | 0 | 0 | 0 | 0 | 0 | 0 | 0 | 2 | 4 | 0 | 0 | 0 |
| 0 | 0 | 6 | 0 | 0 | 0 | 0 | 0 | 4 | 0 | 0 | 0 | 2 | 0 | 0 | 0 | 0 | 0 |
| 0 | 0 | 0 | 0 | 2 | 0 | 0 | 4 | 0 | 0 | 0 | 0 | 0 | 0 | 0 | 6 | 0 | 0 |
| 4 | 0 | 0 | 0 | 0 | 0 | 0 | 0 | 0 | 6 | 2 | 0 | 0 | 0 | 0 | 0 | 0 | 3 |
| 0 | 0 | 0 | 0 | 0 | 4 | 6 | 0 | 0 | 2 | 0 | 0 | 0 | 0 | 0 | 0 | 0 | 0 |
| 0 | 0 | 0 | 2 | 0 | 0 | 0 | 0 | 4 | 0 | 0 | 0 | 0 | 6 | 0 | 0 | 0 | 0 |
| 0 | 0 | 0 | 0 | 0 | 0 | 0 | 0 | 6 | 0 | 2 | 0 | 0 | 0 | 0 | 4 | 0 | 0 |
| 2 | 0 | 0 | 0 | 0 | 0 | 0 | 0 | 0 | 0 | 0 | 0 | 4 | 6 | 0 | 0 | 0 | 1 |
| 0 | 0 | 0 | 0 | 4 | 0 | 2 | 6 | 0 | 0 | 0 | 0 | 0 | 0 | 0 | 0 | 0 | 0 |
| 0 | 0 | 2 | 4 | 0 | 6 | 0 | 0 | 0 | 0 | 0 | 0 | 0 | 0 | 0 | 0 | 0 | 0 |
| 0 | 2 | 0 | 6 | 0 | 0 | 0 | 0 | 0 | 0 | 4 | 0 | 0 | 0 | 0 | 0 | 0 | 5 |
| 0 | 4 | 0 | 0 | 0 | 2 | 0 | 0 | 0 | 0 | 0 | 6 | 0 | 0 | 0 | 0 | 0 | 7 |
| 0 | 0 | 0 | 0 | 0 | 0 | 4 | 0 | 0 | 0 | 0 | 6 | 0 | 0 | 2 | 0 | 0 | 0 |
| 0 | 0 | 0 | 0 | 6 | 0 | 0 | 2 | 0 | 0 | 4 | 0 | 0 | 0 | 0 | 0 | 0 | 0 |
| 6 | 0 | 0 | 0 | 0 | 0 | 0 | 0 | 0 | 0 | 0 | 0 | 4 | 0 | 2 | 0 | 0 | 0 |
| 0 | 0 | 4 | 0 | 0 | 0 | 0 | 0 | 2 | 6 | 0 | 0 | 0 | 0 | 0 | 0 | 0 | 0 |
| | | 0 | 0 | 5 | 0 | 0 | 0 | 0 | 7 | 0 | 1 | 3 | 0 | 0 | 0 | | |
| | | 3 | 5 | 0 | 0 | 0 | 0 | 7 | 1 | 0 | 0 | 0 | 0 | 0 | 0 | | |
| | | 0 | 0 | 0 | 7 | 3 | 0 | 0 | 0 | 0 | 5 | 0 | 0 | 0 | 1 | | |
| | | 0 | 0 | 0 | 0 | 0 | 7 | 0 | 0 | 0 | 0 | 0 | 0 | 5 | 1 | 0 | |
| | | 7 | 0 | 0 | 0 | 0 | 0 | 5 | 0 | 0 | 0 | 0 | 1 | 0 | 0 | 3 | |
| | | 0 | 1 | 7 | 0 | 0 | 3 | 0 | 0 | 0 | 0 | 5 | 0 | 0 | 0 | 0 | |
| | | 0 | 0 | 0 | 0 | 7 | 0 | 0 | 3 | 0 | 1 | 0 | 0 | 0 | 5 | 0 | |
| | | 0 | 0 | 0 | 3 | 0 | 0 | 0 | 0 | 5 | 0 | 0 | 0 | 7 | 0 | 0 | |
| | | 0 | 0 | 0 | 1 | 0 | 0 | 0 | 5 | 0 | 0 | 7 | 0 | 3 | 0 | 0 | |

-continued

| | | | | | | | | | | | | | | | |
|---|---|---|---|---|---|---|---|---|---|---|---|---|---|---|---|
| 0 | 0 | 3 | 0 | 0 | 0 | 0 | 0 | 1 | 0 | 0 | 5 | 0 | 7 | 0 | |
| 0 | 7 | 0 | 0 | 1 | 0 | 3 | 0 | 0 | 0 | 0 | 0 | 0 | 0 | 0 | |
| 0 | 0 | 0 | 0 | 0 | 1 | 0 | 0 | 0 | 3 | 0 | 0 | 0 | 0 | 5 | |
| 1 | 0 | 0 | 5 | 0 | 0 | 0 | 0 | 3 | 7 | 0 | 0 | 0 | 0 | 0 | |
| 5 | 0 | 1 | 0 | 0 | 0 | 0 | 0 | 0 | 0 | 0 | 7 | 0 | 3 | 0 | |
| 0 | 0 | 0 | 0 | 5 | 0 | 1 | 0 | 0 | 0 | 3 | 0 | 0 | 0 | 7 | |
| 0 | 3 | 0 | 0 | 0 | 5 | 0 | 7 | 0 | 0 | 0 | 0 | 1 | 0 | 0 | |

As shown, the table includes codes for sixteen 16 devices with odd and even frequencies separated. The table also includes an additional column of zeros (highlighted) was added to further separate the chips from the two subsets. FIG. 24 shows the best and the worst performing codes out of the set in the above table showing the combined matrices.

Figure 24A:
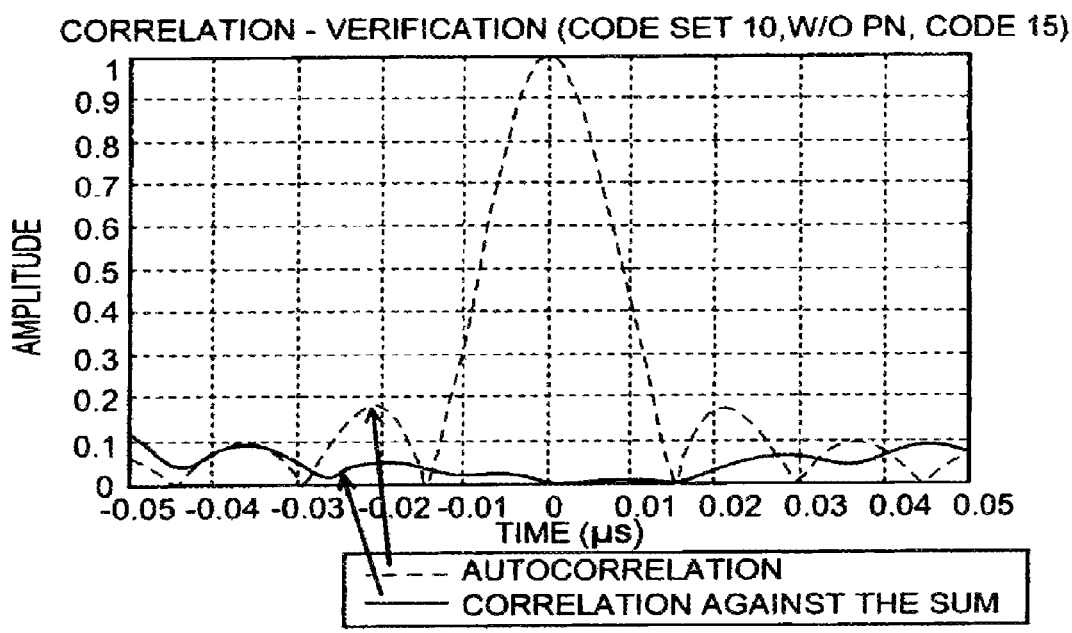
FIG. 24a shows the best performing codes out of the 16 code set shown in Table 9.
Figure 24B:
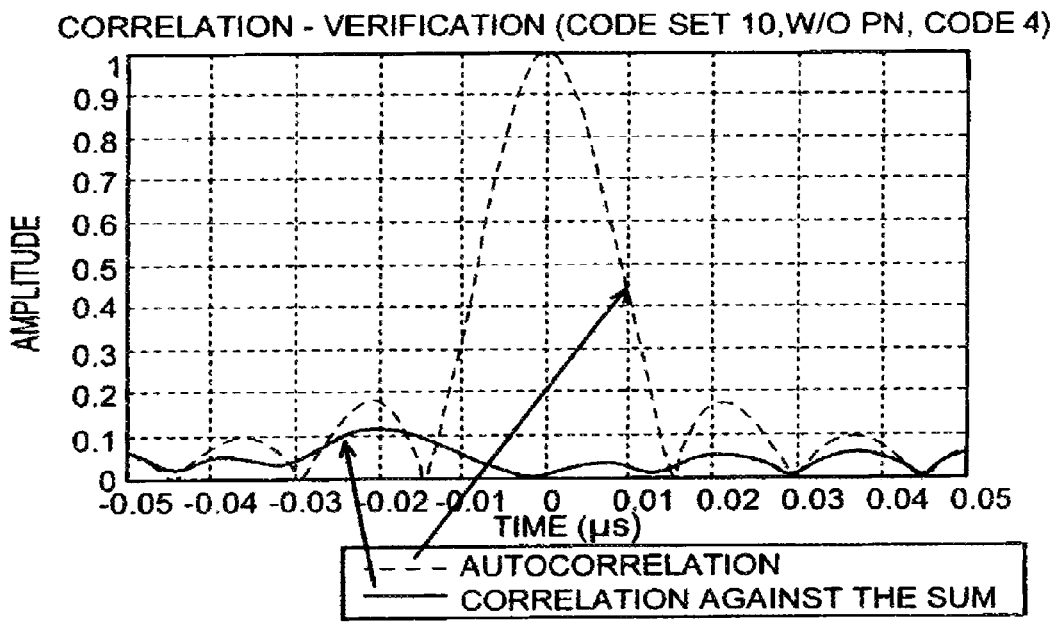
FIG. 24b shows the worst performing codes out of the 16 code set shown in Table 9.

FIGS. 24a and 24b show the best (a) and the worst (b) performing codes out of the 16 code set. When the worst and the best case of codes from table 9 above are compared to best performing codes of Table 1 shown in FIGS. 21a and 21b respectively, this method shows an advantage. On average, codes from last set perform as good as the best code from the first table corresponding to the first example.

Up to this point PN coding was not used. Use of PN coding reduces code collision (ripple around main correlation peak) even further and reduces false correlation peaks. The best that can be done with false correlation peaks with 7 OFC chips is making them one-seventh 1/7 height of main correlation peak. Theoretically, it could be reduced to zero with an even number of chips; however, such a code set would heavily depend on not only presence of every code, but also on amplitudes of reflected waves, which should be very similar for every device.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A surface acoustic wave device comprising:
    an orthogonal code selected to mitigate code collisions in a wireless multi-tag system, the orthogonal coded signal including a chip offset delay to increase code diversity; and
    a substrate having a banks of reflectors and a transducer and antenna pair coupled with the banks of reflectors fabricated on the substrate for producing plural stepped frequencies according to the selected orthogonal code, each stepped frequency having a different center frequency within a bandwidth.

2. The surface acoustic wave device of claim 1, wherein the chip offset delay comprises:
    one single zero weight reflector grating for a one chip offset delay to increase code diversity.

3. The surface acoustic wave device of claim 1, wherein the chip offset delay comprises:
    two or more zero weight reflector gratings for at least two chip offset delays to increase code diversity.

4. The surface acoustic wave device of claim 1, wherein the chip offset delay comprises:
    a zero weight reflector grating between each one of the plural reflectors to produce the orthogonal frequency code signal with a chip delay between each one of the plural orthogonal frequencies to increase code diversity.

5. The surface acoustic wave device of claim 1, wherein the bank of reflector gratings comprise:
    a variable weighted reflector grating to increase code diversity.

6. The device of claim 5 wherein the variable weighted reflector grating comprise:
    a spatially weighted reflector grating to generate a stop-band response.

7. The device of claim 1 wherein the plural stepped frequencies are contiguous in time.

8. The device of claim 1 wherein the plural stepped frequencies are not contiguous in time.

9. The surface acoustic wave device of claim 1 wherein the orthogonal coded signal selection comprises:
    a M by N code matrix dimension based on the number of orthogonal frequency codes needed M and the number of locations chips can populate N, each row corresponding to one surface acoustic wave device orthogonal frequency code and each cell in each row corresponding to one orthogonal chip and the chips are orthogonal to each other at their respective center frequencies;
    one of the orthogonal frequency chips with a different one of the orthogonal frequencies in each cell in each column of the matrix; and
    one of the resulting codes from the populated matrix applied to each one of the surface acoustic wave OFC devices in the multi-tag system.

10. The surface acoustic wave device of claim 9 wherein the M by N matrix comprises:
    a quantity of OFC surface acoustic devices M in the multi-tag system; and
    a quantity of chips N in the orthogonal frequency coded signals for the OFC surface acoustic wave devices in the multi-tag system, wherein M is the number of codes with one single code per surface acoustic wave tag.

11. The surface acoustic wave device of claim 9 wherein the M by N matrix comprises:
    a number of chips n per OFC device; and
    a number of overlapping chips m allowed in the matrix, the M by N code matrix dimension determined according to $$N = \mathrm{ceil}\left(\frac{n \cdot M}{m}\right).$$

12. The surface acoustic wave device of claim 11 wherein the number of overlapping chips m includes same-frequency overlaps.

13. The surface acoustic wave device of claim 12 wherein overlap of the chips is m=n, then N=M.

14. The surface acoustic wave device of claim 11 wherein the number of overlapping chips m excludes same-frequency overlaps.

15. The surface acoustic wave device of claim 9 wherein the populating the matrix step comprises the step of:
  a next available orthogonal frequency code, each chip in the next available orthogonal frequency code assigned to a location in the matrix.

16. The surface acoustic wave device of claim 9 wherein the next available orthogonal frequency code comprises:
  a first orthogonal frequency code, the next available orthogonal frequency code retrieved after each chip in the first orthogonal frequency code has been assigned a location in the matrix;
  a last chip in a last code assigned a last location in the matrix as a completed matrix; and
  an error message or an invalid code set returned to a user when a location for one of the chips in the code is not found.

17. The surface acoustic wave device of claim 16 the next available orthogonal frequency code is determined according to each next chip in the first orthogonal frequency code retrieved and assigned one of the cells in one row of the matrix, the next orthogonal frequency code retrieved, the next chip in the next orthogonal frequency code retrieved and assigned to a next row of the matrix that is not assigned one of the chips, the columns of the located cells that are not assigned the same chip are located, the column with the least number of chips is located, the chip is assigned to the cell in the column with the least number of chips when a column is located, the column with the second least number of chips is located when the column with a least number of chips is not found, the chip ids assigned to the cell in the column with the second least number of chips when the next column is located, the one of the error message or the invalid code set is returned when no next column is located, a last chip is detected, the steps are repeated when the chip is not the last chip, when the next orthogonal frequency code is the last orthogonal frequency code, the steps are repeated, and the completed matrix is returned when the last chip in the last code has been assigned a location.

* * * * *